(12) United States Patent
Kim

(10) Patent No.: US 8,811,275 B2
(45) Date of Patent: Aug. 19, 2014

(54) METHOD OF EXCHANGING MESSAGES, SINK DEVICE AND SOURCE DEVICE

(75) Inventor: Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1317 days.

(21) Appl. No.: 12/591,166

(22) Filed: Nov. 10, 2009

(65) Prior Publication Data

US 2010/0315997 A1 Dec. 16, 2010

Related U.S. Application Data

(60) Provisional application No. 61/187,282, filed on Jun. 16, 2009.

(30) Foreign Application Priority Data

Aug. 4, 2009 (KR) .......................... 10-2009-0071744

(51) Int. Cl.
*H04W 4/00* (2009.01)
*G01R 31/08* (2006.01)

(52) U.S. Cl.
USPC .......................................... 370/328; 370/252

(58) Field of Classification Search
USPC .......................................................... 370/328
See application file for complete search history.

(56) References Cited

U.S. PATENT DOCUMENTS

| | | | |
|---|---|---|---|
| 6,801,939 B1 | 10/2004 | Chafe | |
| 7,408,883 B2 * | 8/2008 | Deragon et al. | 370/249 |
| 2004/0063454 A1 | 4/2004 | Sasaki | |
| 2004/0088434 A1 | 5/2004 | Takabatake | |
| 2005/0148314 A1 | 7/2005 | Taglienti et al. | |
| 2005/0149635 A1 * | 7/2005 | Otsuka et al. | 710/1 |
| 2005/0182501 A1 * | 8/2005 | Franchuk et al. | 700/81 |
| 2005/0254524 A1 | 11/2005 | An | |
| 2006/0174304 A1 * | 8/2006 | Kim et al. | 725/116 |
| 2007/0109961 A1 | 5/2007 | Liang | |
| 2008/0031136 A1 | 2/2008 | Gavette et al. | |
| 2008/0049633 A1 | 2/2008 | Edwards et al. | |

(Continued)

FOREIGN PATENT DOCUMENTS

| | | |
|---|---|---|
| EP | 1596559 | 11/2005 |
| JP | 2008-219311 A | 9/2008 |

(Continued)

OTHER PUBLICATIONS

Mohan et al. "Drive test based Edge Radio Network Performance Evaluation", Vehicular technology Conference, 2005. IEEE, vol. 3, Sep. 25, 2005, pp. 1658-1661, XP010878726.

(Continued)

*Primary Examiner* — Gerald Smarth
(74) *Attorney, Agent, or Firm* — Mckenna Long & Aldridge LLP

(57) ABSTRACT

A method of exchanging messages for switching of a sink device of a wireless network to a source device comprises receiving audio/video (A/V) data from a first source device; transmitting a first command to a second source device within the wireless network to identify whether the second source device can transmit A/V data; receiving a second command from the first source device, the second command being transmitted from the second source device in response to the first command and including indication information indicating whether the second source device can transmit A/V data; and determining whether to switch to the second source device depending on the indication information included in the second command.

19 Claims, 36 Drawing Sheets

(56) References Cited

U.S. PATENT DOCUMENTS

| | | | |
|---|---|---|---|
| 2008/0050096 A1* | 2/2008 | Ryu | 386/99 |
| 2008/0056154 A1 | 3/2008 | Firestone et al. | |
| 2008/0068152 A1 | 3/2008 | Igoe | |
| 2008/0101253 A1 | 5/2008 | Shvodian | |
| 2008/0134005 A1 | 6/2008 | Izzat et al. | |
| 2008/0144553 A1 | 6/2008 | Shao et al. | |
| 2008/0220767 A1 | 9/2008 | Aretz et al. | |
| 2008/0244679 A1 | 10/2008 | Sukumar et al. | |
| 2008/0320539 A1 | 12/2008 | Ohkita | |
| 2009/0010233 A1* | 1/2009 | Pratt et al. | 370/338 |
| 2009/0051765 A1 | 2/2009 | Moberly | |
| 2009/0054033 A1* | 2/2009 | Pratt et al. | 455/410 |
| 2009/0225669 A1 | 9/2009 | Qin et al. | |
| 2009/0241147 A1 | 9/2009 | Kim et al. | |
| 2009/0262709 A1* | 10/2009 | Mason et al. | 370/336 |
| 2009/0271530 A1 | 10/2009 | Ohkita | |
| 2009/0310574 A1 | 12/2009 | Jeon et al. | |
| 2009/0327572 A1* | 12/2009 | Cho et al. | 711/5 |
| 2010/0020770 A1 | 1/2010 | Qin et al. | |
| 2010/0149301 A1* | 6/2010 | Lee et al. | 348/14.08 |

FOREIGN PATENT DOCUMENTS

| | | |
|---|---|---|
| KR | 10-0782837 B1 | 12/2007 |
| KR | 10-0846800 | 7/2008 |
| KR | 10-2009-0057946 | 6/2009 |
| WO | WO 01/58162 | 8/2001 |
| WO | WO 2008/072910 | 6/2008 |

OTHER PUBLICATIONS

Christian Huitema: "Routing in the Internet, the Internet Protocol", Jan. 1, 2000, pp. 38-39, XP002600850.

* cited by examiner

In Blocks : B0, B1, B2, B3, B4, ...
Out Blocks : B0, B16, B32, B48, B64, ..., B1, B17, B33, B49, B65, ... , B2, B18, B34, B50, B66, ...

FIG. 13

| Block Processing | Block Type | Quantization | Rate Adjustment |
|---|---|---|---|
| 1 bit | 1 bit | $N_{bits\_per\_block}$ bits | 0 - 1 bits |

FIG. 33

| Size | 2 bytes | 2 bytes | 1 byte | 1-254 bytes | 2 bytes |
|---|---|---|---|---|---|
|  | Message Preamble | Type | Length | message Body | MCS |

METHOD OF EXCHANGING MESSAGES, SINK DEVICE AND SOURCE DEVICE

Pursuant to 35 U.S.C. §119(a), this application claims the benefit of earlier filing date and right of priority to Korean Application No. 10-2009-0071744, filed on Aug. 4, 2009, and pursuant to 35 U.S.C. §119(e), this application further claims benefit of priority from provisional patent application 61/187,282, filed Jun. 16, 2009. The contents of such applications are hereby incorporated by reference herein in their entirety

BACKGROUND OF THE INVENTION

1. Field of the Invention

The present invention relates to a method of exchanging messages, a sink device and a source device, and more particularly, to a method of exchanging messages between devices in a wireless network, and a sink device for the same.

2. Discussion of the Related Art

Recently, with the development of communication, computer, and network technologies, many kinds of networks have been developed and used for actual life. Examples of the network include a large-scaled network, such as wire or wireless Internet, which connects the whole world, and a small-scaled wire or wireless network that connects home appliances with one another within a limited place such as general homes or companies. With a variety of network types, various interfacing technologies that allow communication between networks or between devices by connecting them with each other have been developed.

FIG. 1 is a brief diagram illustrating an example of a wireless video access network (WVAN) which is a kind of a wireless private access network (WPAN).

The WVAN is a wireless network that can support uncompressed transmission of 1080 P A/V streams by configuring wireless networks between digital devices within a limited space of 10 m or less such as home to obtain throughput of 4.5 Gbps or greater with a bandwidth of about 7 GHz. In this respect, the WVAN is a network configured between personal devices within a limited space. In this way, by configuring a network through direct communication between devices, information can be exchanged between applications without seamlessness.

Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

A high-capacity video bus uses a high-speed digital signal transmission mode of 1 Gbps or greater to transmit audio data of HD screen of 1080 p or greater and high quality. However, since such a high-capacity video bus is transmitted through a specific cable connected between devices, a demand of a user who desires to transmit data of a high-speed A/V bus in real-time and a wireless mode is being increased. In case of data transmission of a high-speed A/V bus in a wireless mode, it is advantageous in that the number of cables can be reduced and there is no distance limitation between devices. However, in case of WLAN(IEEE802.11), since A/V data and other data are all processed as general data by a physical layer system, there is difficulty in transmitting data of a high-speed A/V bus in a wireless mode.

In this respect, A/V data transmission has been tried using a wireless home digital interface (WHDI) network. However, a problem occurs in that if a message <Action Reject> or <Wait> is transmitted in response to a request of an AVCL message, detailed information of the message <Action Reject> or <Wait> has not been provided.

SUMMARY OF THE INVENTION

Accordingly, the present invention is directed to a method of exchanging messages, a sink device and a source device, which substantially obviate ones or more problems due to limitations and disadvantages of the related art.

An object of the present invention is to provide a method of exchanging messages, in which the messages include information indicating a status of a device when a response message is transmitted in response to a request of an AVCL message, wherein the status is the reason of the response message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment of a first aspect of the present invention, a method of exchanging messages for switching of a sink device of a wireless network to a source device comprises receiving audio/video (A/V) data from a first source device; transmitting a first command to a second source device within the wireless network to identify whether the second source device can transmit A/V data; receiving a second command from the first source device, the second command being transmitted from the second source device in response to the first command and including indication information indicating whether the second source device can transmit A/V data; and determining whether to switch to the second source device depending on the indication information included in the second command.

The indication information included in the second command indicates that the second source device does not desire to transmit A/V data to the sink device or cannot transmit the A/V data to the sink device. The A/V data are received from the first source device by being encapsulated in a first downlink physical data unit (DLPDU). The first command is transmitted to the second source device by being encapsulated in an uplink control physical layer data unit (ULCPDU). The second command is received from the first source device by being encapsulated in a second DLPDU.

In this case, the first downlink physical layer data unit is transmitted for a time period including a first time period for which a MAC message and at least one header are transmitted and a second time period for which the A/V data are transmitted. At this time, the uplink control physical layer data unit is transmitted for the first time period.

Meanwhile, the second command is multiplexed with the A/V data transmitted from the first source device and then included in the second DLPDU. The second DLPDU includes a basic header and an extended header, and the second command is included in the extended header.

In this case, the step of transmitting the first command to the second source device includes receiving the first command including a first identifier for identifying a transmitting device from an audio video control (AVC) layer in a medium access control (MAC) layer, a second identifier for identifying a receiving device, and an action code Opcode; configuring a MAC message in the MAC layer and transferring the MAC message to a physical layer, the MAC message including a message preamble, a message type and the first command; and transmitting the uplink control physical layer data unit from the physical layer to the receiving device, the uplink control physical layer data unit including an uplink control header, the MAC message and audio/video (A/V) data.

The MAC message is multiplexed with the A/V data in the physical layer. And, the MAC message includes a cyclic redundancy check (CRC) code added from the MAC layer to detect an error in the receiving device.

To achieve these objects and other advantages and in accordance with the purpose of the invention, as embodied and broadly described herein, according to one embodiment of a second aspect of the present invention, a sink device receiving A/V data from a first source device in a wireless network comprises an audio video control (AVC) layer generating a first command including a first identifier for identifying the sink device, a second identifier for identifying a second source device, and an action code Opcode; a medium access control (MAC) layer generating a MAC message including a message preamble, a message type and the first command transferred from the AVC layer; and a physical layer generating a first physical layer data unit including an uplink control header, the MAC message and audio/video data and transferring the first physical layer data unit to the second source device, and receiving a second physical layer data unit from the first source device, the second physical layer data unit including a second command being transmitted from the second source device in response to the first command and including indication information indicating whether the second source device can transmit A/V data, wherein the sink device determines to switch to the second source device depending on the indication information included in the second command.

If the indication information included in the second command indicates that the second source device does not desire to transmit A/V data to the sink device or cannot transmit the A/V data to the sink device, the sink device receives the A/V data from the first source device.

Preferably, the first physical layer data unit is an uplink control physical layer data unit (ULCPDU), and the second physical layer data unit is a downlink physical data unit (DLPDU).

The DLPDU is transmitted for a time period including a first time period for which the MAC message and at least one header are transmitted and a second time period for which the A/V data are transmitted, and the ULCPDU is transmitted for the first time period for which a part of the DLPDU should be transmitted.

The second command is multiplexed with the A/V data transmitted from the first source device and then included in the DLPDU. The at least one header includes a basic header and an extended header, and the second command is included in the extended header.

To achieve these objects and other advantages and in accordance with the purpose of the invention, as embodied and broadly described herein, according to another embodiment of a second aspect of the present invention, a sink device of a wireless network comprises a receiving module receiving a broadcasting signal from a first source device; a decoding module decoding the broadcasting signal received by the receiving module; a display module displaying contents according to the broadcasting signal decoded by the decoding module; a network control module generating a first physical layer data unit including a MAC message and transmitting the same to a second source device, the MAC message including the broadcasting signal received by the receiving module and a first command for identifying whether the second source device can transmit A/V data, and receiving a second physical layer data unit including a second command from the first source device and processing the same, the second command being transmitted from the second source device in response to the first command; and a control module controlling the sink device to switch to the second source device through the second command processed by the network control module, store the broadcasting signal received by the receiving module in a local memory device, or play contents stored in the local memory device.

The second command includes indication information indicating whether the second source device can transmit A/V data.

To achieve these objects and other advantages and in accordance with the purpose of the invention, as embodied and broadly described herein, according to one embodiment of a third aspect of the present invention, a method of exchanging messages for switching of a first source device of a wireless network to a source device of a sink device comprises generating a second command including indication information in an AVC layer in response to a first command transmitted from the sink device that receives A/V data from a second source device, the indication information indicating whether the first source device can transmit A/V data; transferring a MAC message from a MAC layer to a physical layer, the MAC message including a message preamble, a message type and the second command transmitted from the AVC layer; transmitting a physical layer data unit from the physical layer to the sink device through the second source device, the physical layer data unit including at least one header, the MAC message, and the A/V data; and determining to switch from the sink device to the first source device depending on the indication information included in the second command.

To achieve these objects and other advantages and in accordance with the purpose of the invention, as embodied and broadly described herein, according to one embodiment of a fourth aspect of the present invention, a source device receiving a first command from a sink device in a wireless network comprises an AVC layer generating a second command including indication information in response to a first command transmitted from the sink device that receives A/V data from a predetermined source device, the indication information indicating whether the source device can transmit A/V data; a MAC layer configuring a MAC message and transferring the MAC message to a physical layer, the MAC message including a message preamble, a message type and the second command; and the physical layer generating a physical layer data unit and transmitting the physical layer data unit to the sink device through the predetermined source device, the physical layer data unit including at least one header, the MAC message, and the A/V data, wherein the sink device determines to switch to the source device to which the first command is transmitted, depending on the indication information included in the second command.

According to the present invention, for message exchange requesting connection for A/V streaming between user devices, a device can transfer more exact information to another device by adding a code indicating the reason of a status of the device through a response message. Specifically, when transmitting an action reject response message, a code indicating the reason of the reject is more subdivided than that of the related art, whereby exact information exchange between devices can be performed and error can be reduced.

In addition, if a wait message is transmitted, the wait message includes <WaitTime> and <WaitReason>. In this way, message exchange is performed and thus more exact signal transmission can be performed through information of the wait time and the wait reason.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram illustrating quantization bits produced for each video block in a DLPDU PHY structure of a WHDI active source device;

FIG. 33 is a diagram illustrating an example of a MAC message existing in a MAC layer 33 of a transmitting device;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The embodiments of the present invention disclose a method of performing a performance test of a wireless routing path for A/V data transmission in a wireless home digital interference (WHDI) network.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

A wireless home digital interface (WHDI) system which is recently being studied is to transmit uncompressed audio and/or vide (A/V) data at a 5 Ghz U-NII bandwidth. In the WHDI system, a PHY layer is responsible for the tasks to process and modulate A/V data considering a human audio-visual characteristic, whereby high-capacity video bus data are converted to wireless data more efficiently. In this case, in order to test wireless performance, a radar sensing scheme having radio signal intensity of 5 Ghz is applied to a receiver. The WHDI requires a technology that can properly test transmission performance of control data or non-A/V data. This is because that functions such as setting of a wireless routing path, setting of a retransmission window, and response performance test of a host system can easily be implemented using the technology.

At least one user device included in the WHDI system includes a source device transmitting A/V data and a sink device receiving A/V data from the source device. In this case, the source device that actually transmits A/V data will be regarded as an active source device. And the sink device that receives Audio/Video signals does not actually transmit A/V data and includes a passive source does not actually transmit A/V data and additionally connected with the active source device. Each of the devices can be divided into at least three layers depending on its functions. Generally, each of the devices includes a PHY layer, a media access control (MAC) layer, and an AVC layer.

Figure 1:
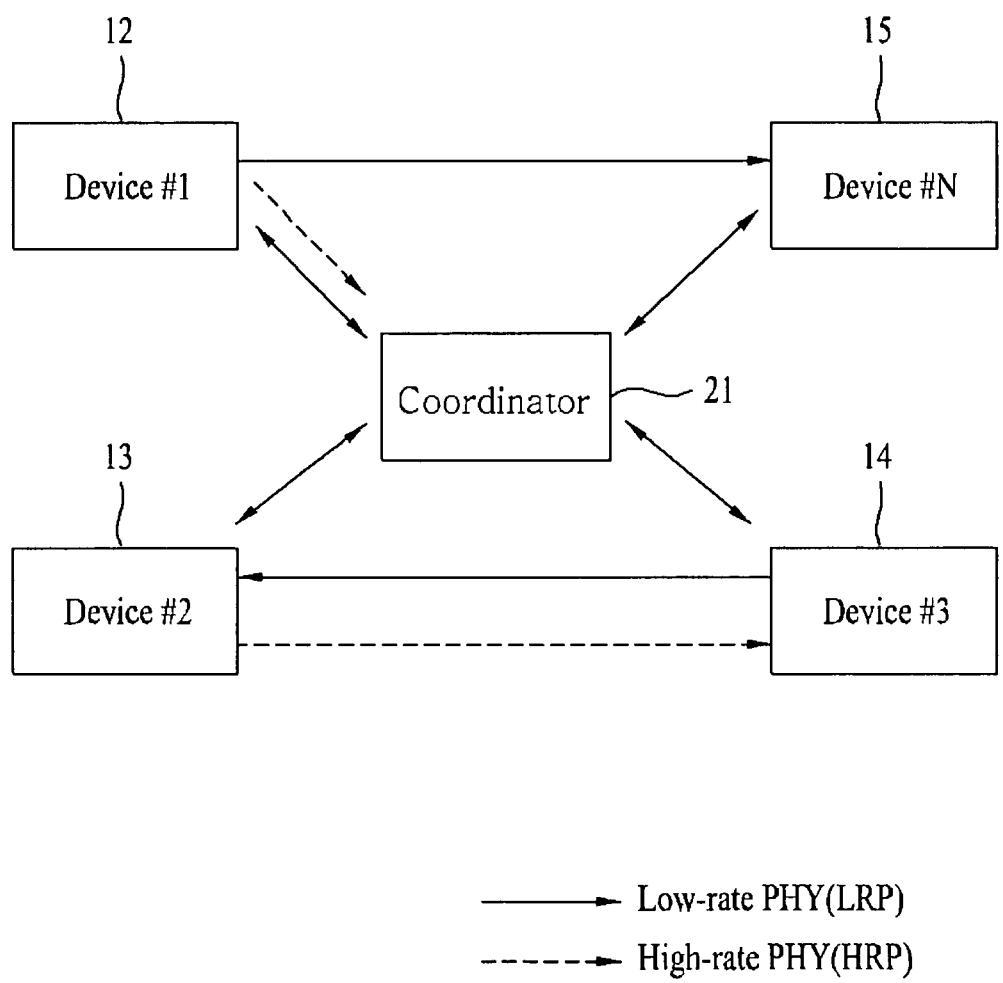
FIG. 1 a brief diagram illustrating an example of user devices constituting WVAN.
Figure 2:
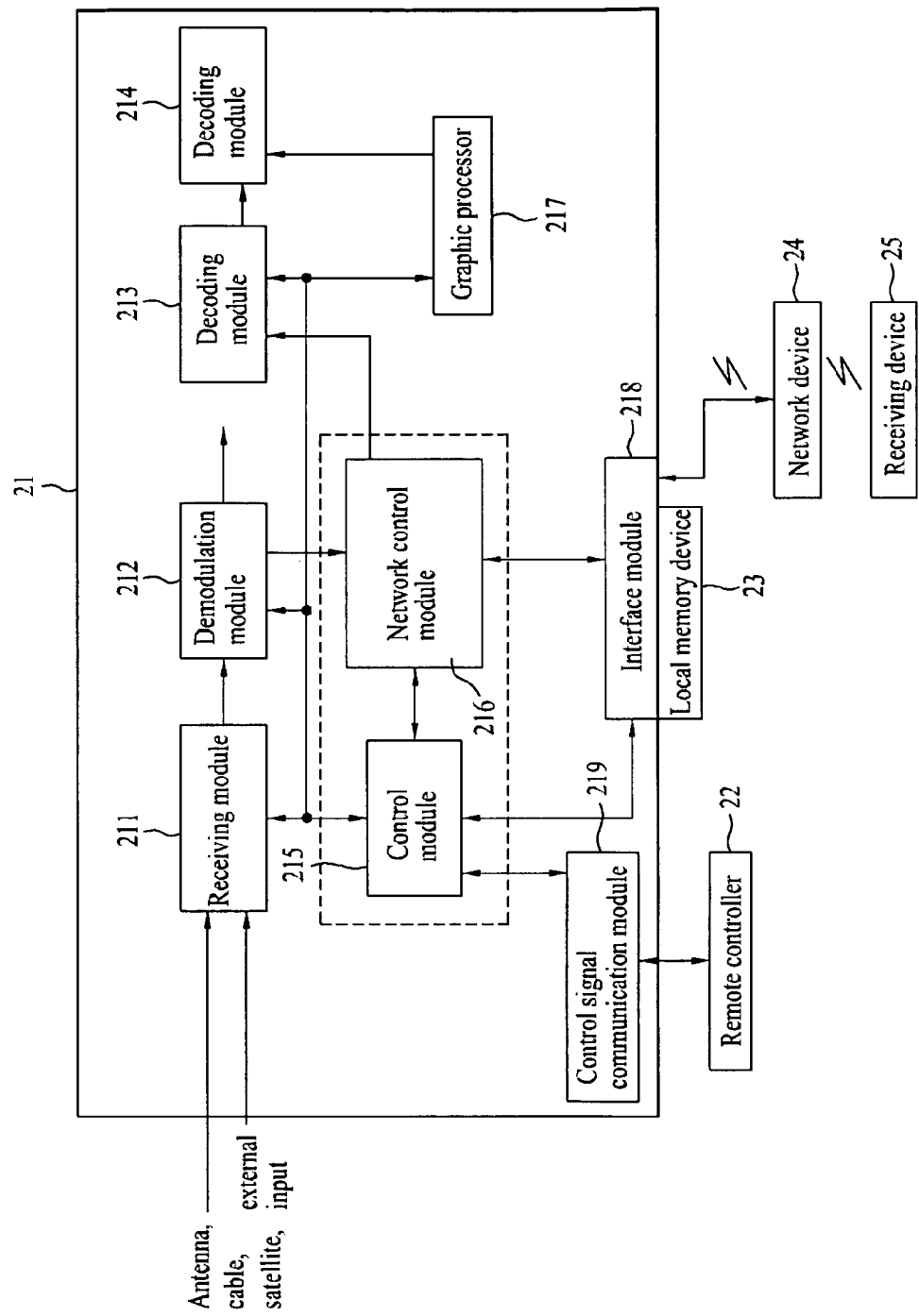
FIG. 2 is a diagram illustrating an embodiment of a broadcasting signal processing system that includes a broadcasting signal receiver as an example of a transmitting device in a wireless home digital interface (WHDI) system.

FIG. 2 is a diagram illustrating an embodiment of a broadcasting signal processing system that includes a broadcasting signal receiver as an example of a transmitting device in a wireless home digital interface (WHDI) network.

The broadcasting signal receiver can play A/V data (hereinafter, referred to as A/V data received through processes which will be described layer) input from a broadcasting station or a cable satellite through an antenna. Also, when the broadcasting signal receiver acts as a transmitting device on the WHDI network, it can remotely transmit the received A/V data to at least one receiving device.

Referring to FIG. 2, the broadcasting signal processing system which is an example of the transmitting device includes a broadcasting signal receiver 21 and a network device 24 that connects the broadcasting signal receiver with a remote memory device or other device 25.

The broadcasting signal receiver 21 includes a receiving module 211, a demodulation module 212, a decoding module 213, a display module 214, a control module 215, a network control module 216, a graphic processor 217, an interface module 218, and a control signal communication module 219. In the example of FIG. 2, the broadcasting signal receiver 21 further includes a local memory device 23 directly connected with the interface module 218 that includes input and output ports. However, the local memory device may be a memory device mounted in the broadcasting signal receiver 21.

The interface module 218 can communicate with the wire/wireless network device 24, and can be connected with at least one receiving device 25 through the network device 24, wherein the at least one receiving device 25 exists on the wireless network. The control signal communication module 219 receives a user control signal in accordance with a user control device, for example, remote controller 22, and outputs the received signal to the control module 215.

The receiving module 211 could be a tuner that receives a broadcasting signal of a specific frequency through at least one of ground wave, satellite, cable, and Internet network. The receiving module 211 may be provided respectively for each of broadcasting sources, for example, ground wave broadcasting, cable broadcasting, satellite broadcasting, and personal broadcasting. Alternatively, the receiving module 211 may be a unified tuner. Also, supposing that the receiving module 211 is a tuner for ground wave broadcasting, at least one digital tuner and at least one analog tuner may be provided respectively, or a digital/analog tuner may be provided.

Furthermore, the receiving module 211 may receive internet protocol (IP) streams transferred through wire and wireless communication. If the receiving module 211 receives IP streams, the receiving module 211 can process transmitting and receiving packets in accordance with an IP protocol that establishes source and destination information for received IP packets and packets transmitted from the broadcasting signal receiver. The receiving module 211 can output video/audio/data streams included in the received IP packets in accordance with the IP protocol, and can generate transport streams to be transmitted to the network as IP packets in accordance with the IP protocol to output them. The receiving module 211 is an element that receives an externally input video signal, and, for example, may receive IEEE 1394 type video/audio signals or HDMI type streams from the outside.

The demodulation module 212 demodulates the input broadcasting signals in an inverse order of a modulation mode. The demodulation module 212 outputs broadcasting streams by demodulating the broadcasting signals. If the receiving module 211 receives stream type signals, for example, IP streams, the IP streams are output to the decoding module 213 after bypassing the demodulation module 212.

The decoding module 213 includes an audio decoder and a video decoder, and decodes the broadcasting streams output from the demodulation module 212 or streams produced through the network control module 216 through their respective algorithms and outputs the decoded streams to the display module 214. At this time, a demultiplexer (not shown) that splits each stream in accordance with a corresponding identifier may additionally be provided between the demodulation module 212 and the decoding module 213. The demultiplxer splits the broadcasting signals into an audio element stream (ES) and a video element stream and outputs them to each decoder of the decoding module 213. Also, if a plurality of programs is multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The graphic processor 217 processes a graphic to be displayed so that a menu screen is displayed in a video image displayed by the display module 214, and controls the graphic to be displayed in the display module 214 together with the menu screen.

The interface module 218 can be interfaced with at least one receiving device 25 through a wire and wireless network. Examples of the interface module 218 include Ethernet module, Bluetooth module, short distance wireless Internet module, portable Internet module, home PNA module, IEEE1394 module, PLC module, home RF module, and IrDA module. Meanwhile, the interface module 218 can output a control signal to a remote memory device, wherein the control signal can turn on the power. For example, although not shown in FIG. 2, the interface module 218 can turn on the power of a separate remote memory device by transmitting a WOL signal to a network interface module that performs communication with the remote memory device.

The network control module 216 is operated to transmit the broadcasting signals received by the receiving module 211 together with MAC message through a physical layer data unit when the broadcasting signal receiver 21 illustrated in FIG. 2 transmits the broadcasting signals received therein to another device on the WHDI network. The network control module 216 may directly receive the broadcasting signals from the receiving module 211, or may receive the broadcasting signals demodulated by the demodulation module 212. In case of the former case, an encoding process may be omitted. Also, the broadcasting signals received by the receiving module 211 can be input to the protocol layer module 216 after going through a processing procedure for signal transmission in the control module 215. For example, if a message including the broadcasting signals is received from the receiving device 25, the received message is split into a broadcasting signal and MAC message by the network control module 216. The split broadcasting signal (or broadcasting stream) is input to the decoding module 213, decoded by a decoding algorithm, and output to the display module 214.

The network work control module 216 may be regarded as a second control module different from the control module 215, wherein the second control module controls an AVC layer generating a predetermined audio video control layer (AVCL) command, a MAC layer generating MAC message including the AVCL command transferred from the AVC layer, and a PHY layer generating a first physical layer data unit including the broadcasting signals input from the receiving module 211 or the demodulation module 212 and the MAC message. The first physical layer data unit can be transmitted to another device using the network device 24 through the interface module 218. Also, the network control module 216 can receive a second physical layer data unit including a response message transmitted from the receiving device which has received the AVCL command, wherein the response message is transmitted in response to the AVCL command.

Although the control module 215 and the network control module 216 are provided separately in FIG. 2, these control modules can be implemented by one system chip as illustrated in a dotted part. Specifically, in the protocol layer that includes the AVC layer, the MAC layer and the PHY layer, which are controlled by the network control module 216, the AVC layer and the MAC layer can identify a message to be transmitted or received within the control module 215. At this time, the PHY layer forms a physical layer data block in the network control module 216. The network control module 216 will be described in detail with reference to a structure of the physical layer data block illustrated in FIG. 9 to FIG. 16.

The control module 215 can control the operations of the aforementioned modules (receiving module, demodulation module, decoding module, display module, graphic processor, network control module, and interface module). Also, the control module 215 displays a menu that receives a control command of the user, and drives an application that displays various kinds of information or menu of a broadcasting signal processing system for the user.

For example, the control module 215 can read out contents stored in the local memory device 23 if the local memory device 23 is mounted the broadcasting signal receiver. Also, the control module 215 can control the operation of the local memory device 23 so that the broadcasting contents received from the receiving module 211 are stored in the local memory device 23 if the local memory device 23 is mounted in the broadcasting signal receiver. Furthermore, the control module 215 can output a control signal for mounting the local memory device 23 depending on whether the local memory device 23 has been mounted in the broadcasting signal receiver.

The control module 215 checks remaining memory capacity of the local memory device 23, and allows information of the remaining memory capacity to be displayed for the user on the display module 214 through the graphic processor 217. The control module 215 can shift the contents stored in the local memory device 23 to the remote memory device if the remaining memory capacity of the local memory device 23 is not sufficient. In this case, the control module 215 can display a menu indicating whether to shift the contents stored in the local memory device to another local memory device (not shown) or the remote memory device through the display module 214. And, the control module 215 can receive and process a user control signal of the menu. Accordingly, the control module 215 can allow the contents stored in the local memory device 23 and other directly or remotely mounted memory device to be shifted between them and stored therein.

The display module 214 displays the broadcasting contents received from the receiving module 211 and the contents stored in the local memory device 23. The control module 214 can display a menu indicating whether the memory device has been mounted in the broadcasting signal receiver and information related to the remaining capacity of the memory device, in accordance with a control command of the control module 215, and can be operated under the control of the user.

According to one embodiment of the present invention, the transmitting device illustrated in FIG. 2 is an example of a sink device that receives A/V data from the active source device, and can generate a command in the network control module 216 to determine switching to another source device (for example, passive source device), wherein the command is to identify whether the passive source device can transmit A/V data. In case of message exchange for switching of the source device, the receiving device 25 of FIG. 2 will be an example of the passive source device.

Figure 3:
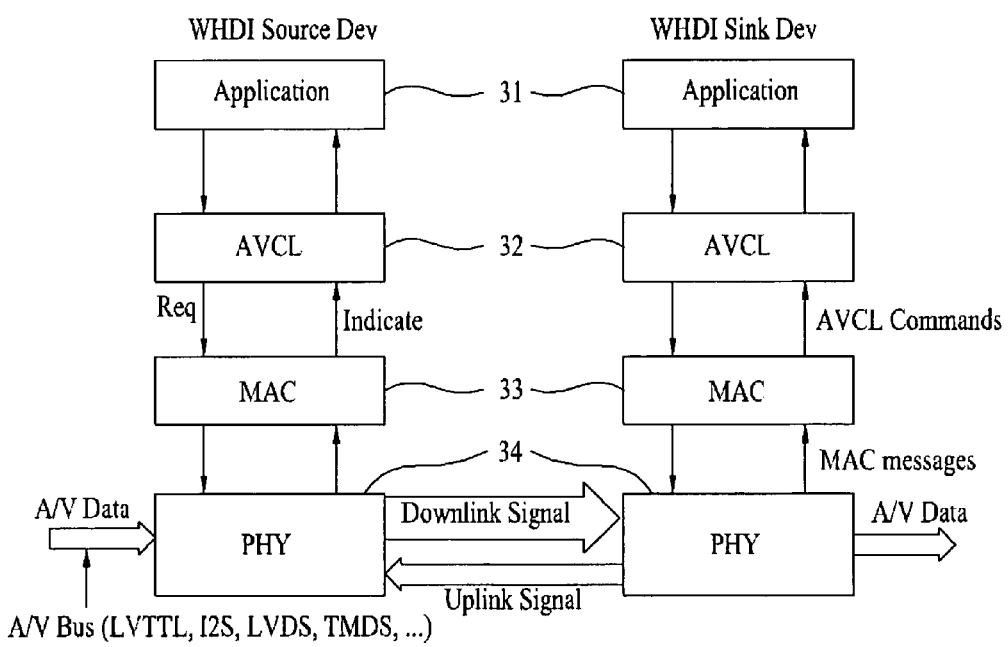
FIG. 3 is a diagram illustrating an example of a protocol layer structure implemented in a device of a WHDI system.

FIG. 3 is a diagram illustrating an example of a protocol layer structure implemented in a device of a WHDI system. The protocol layer structure is implemented in the network control module 216 of FIG. 2.

Referring to FIG. 3, the WHDI system includes four layers.

An application layer 31 which is the uppermost layer is to allow the user to unify WHDI in a host system of the user.

An audio video control layer (AVCL) 32 is an upper layer that takes the role in device control and streaming connection for A/V data transmission between the source device and the sink device. The AVCL is used to allow the sink device to indicate an active source device that desires to receive A/V streams from a specific source device. The sink device may receive and render A/V streams, or may not need to receive A/V streams any more. Meanwhile, in the source device, the AVCL is used to indicate a specific display requested by the user to display contents on the display module of the source device. Also, the AVCL is used to allow the source device to determine receptive capacity related to A/V data of the sink device or transfer meta data related to A/V data. Moreover, the AVCL is used to allow all devices to perform remote device control (RDC) such as play of a display player or control of channel change on a set-top box.

As described above, the AVCL includes two types of control modes of control protocol and meta data transfer. In this case, the control protocol (or AVCL protocol) includes bidirectional command transmission between devices on an active network. Generally, the message including the AVCL command goes through the MAC layer, is mapped with the MAC message, and is transmitted together with other data in the PHY layer. This will be described later.

Next, a media access control (MAC) layer 33 takes the role in link setup, connection or non-connection, and channel access to a lower layer of a material transmission protocol, and also takes the role in reliable data transmission. In other words, the MAC layer 33 serves to transmit a control/data message or control a channel.

The MAC layer implements subcarrier sense or clear channel assessment (CCA) before transmitting packets using carrier sense multiple access with collision avoidance (CSMA/CA) based on ACK frame as a basic channel access scheme. Considering directionality between the source device and the sink device, the MAC layer is divided into a downlink and an uplink. The downlink is implemented by one long frame, and a recovery process using ACK frame can be skipped in the downlink. Since synchronization between a video frame which is transmitted and a modem (PHY) frame is performed in the downlink, a required transmission time is determined in accordance with a format of A/V data which are transmitted. Generally, a MAC format includes a basic header (BH) and an extended header (EH).

A PHY layer 34 directly processes A/V data and at the same time the A/V data may be processed by the MAC layer 33. In the WHDI, the PHY layer is responsible for the tasks to send and receive the audio and video data which are sampled in the raw. The PHY layer also takes the role to convert the message requested from the upper layers such as the AVCL layer 32 and the MAC layer 33 to the corresponding radio signal, so that the messages can be sent and received between devices by the PHY layer. Also, the PHY Layer has the features including the capability of unidirectional transmission for A/V data and the capability of bidirectional data channel. Moreover, the PHY layer has the features including PHY level encryption of all A/V data and measurement capability for SNR, carrier sense and interference detection.

The PHY Layer accepts/outputs raw video samples in the form of 4:4:4 YCbCr streams of pixels, on the source/sink devices, respectively. The PHY Layer also accepts/outputs raw audio samples in a number of formats, on the source/sink devices, respectively. All conversions into/from these formats are done at the application layer 31 in the source/sink devices, respectively.

Figure 4:
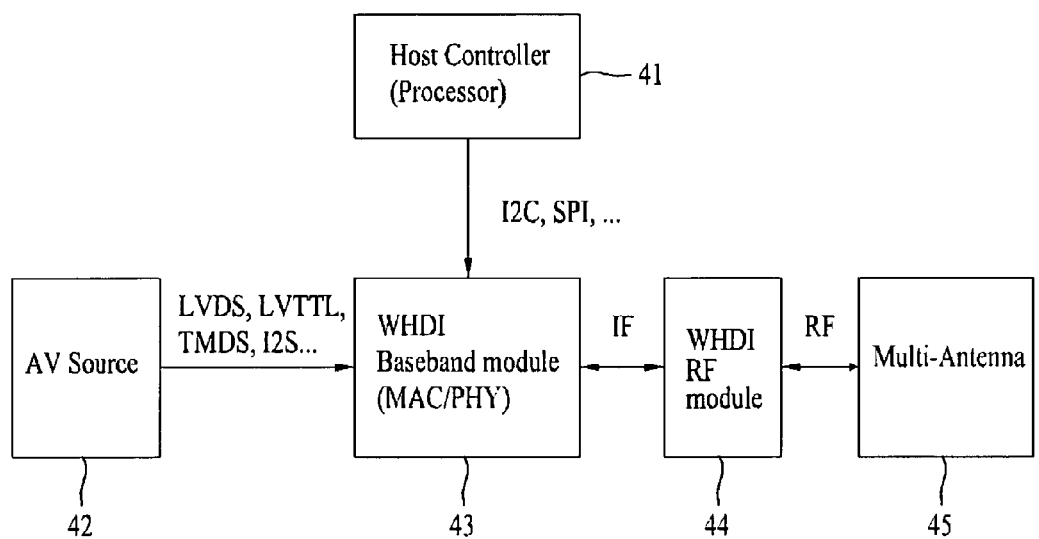
FIG. 4 is a block diagram illustrating an example of a source device in a WHDI system.

FIG. 4 is a block diagram illustrating an example of a source device in a WHDI system.

Referring to FIG. 4, a host controller 41 which is a kind of a processor unifies and manages the whole system, and takes the role to perform the functions of the AVCL or control a WHDI baseband module 43 using an I2C (inter integrated circuit) bus system structure. Since the I2C bus system is operated on a I2C protocol, a plurality of ICs can be connected or communicated with one another through a common bus. The I2C bus system is widely used in a consumer electronic device to provide a method of connecting a central processing unit (CPU) with related peripheral ICs in a television environment (i.e., providing communication between the CP and the peripheral ICs). The I2C system is generally limited to transmit data at a setting clock speed in accordance with a setting protocol, and a main control IC of the I2C system sets a transmission rate or speed (i.e., clock rate or bus speed). Accordingly, all ICs connected with a specific I2C bus should be communicated at the same speed or data transmission rate. The host controller 41 may include a memory therein, or may use an external memory.

The WHDI baseband module 43 takes the role as the aforementioned MAC/PHY layer, and transmits A/V data to a WHDI RF module 44 at an intermediate frequency (IF) by receiving the A/V data from an A/V source device 42 through a bus such as LVDS. The WHDI RF module 44 converts the intermediate frequency (IF) to a carrier signal and transmits the converted microwave signal through a multi-antenna 45. The WHDI RF module 44 can transmit and receive a control signal in addition to the A/V data.

Figure 5:
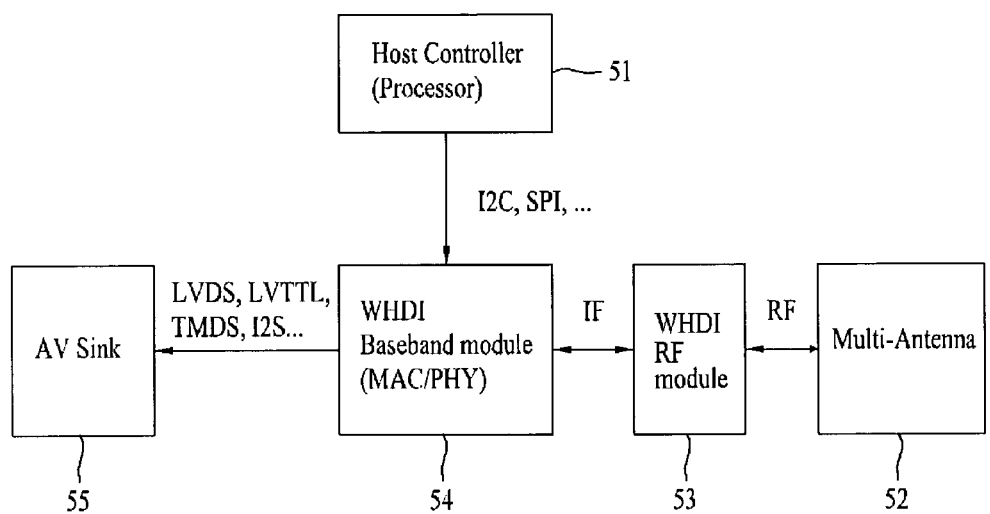
FIG. 5 is a block diagram illustrating an example of a sink device in a WHDI system.

FIG. 5 is a block diagram illustrating an example of a sink device in a WHDI system.

Referring to FIG. 5, like the aforementioned source device, a host controller 51 which is a kind of a processor unifies and manages an application, and takes the role to control a WHDI baseband module 54 using an I2C (inter integrated circuit) bus system structure. A WHDI RF module 53 converts RF signal received from a multi-antenna 52 to an intermediate frequency (IF), and transmits an A/V bus signal such as LVDS and I2S to an A/V sink device 55 by recovering the A/V data transmitted from the source device.

Figure 6:
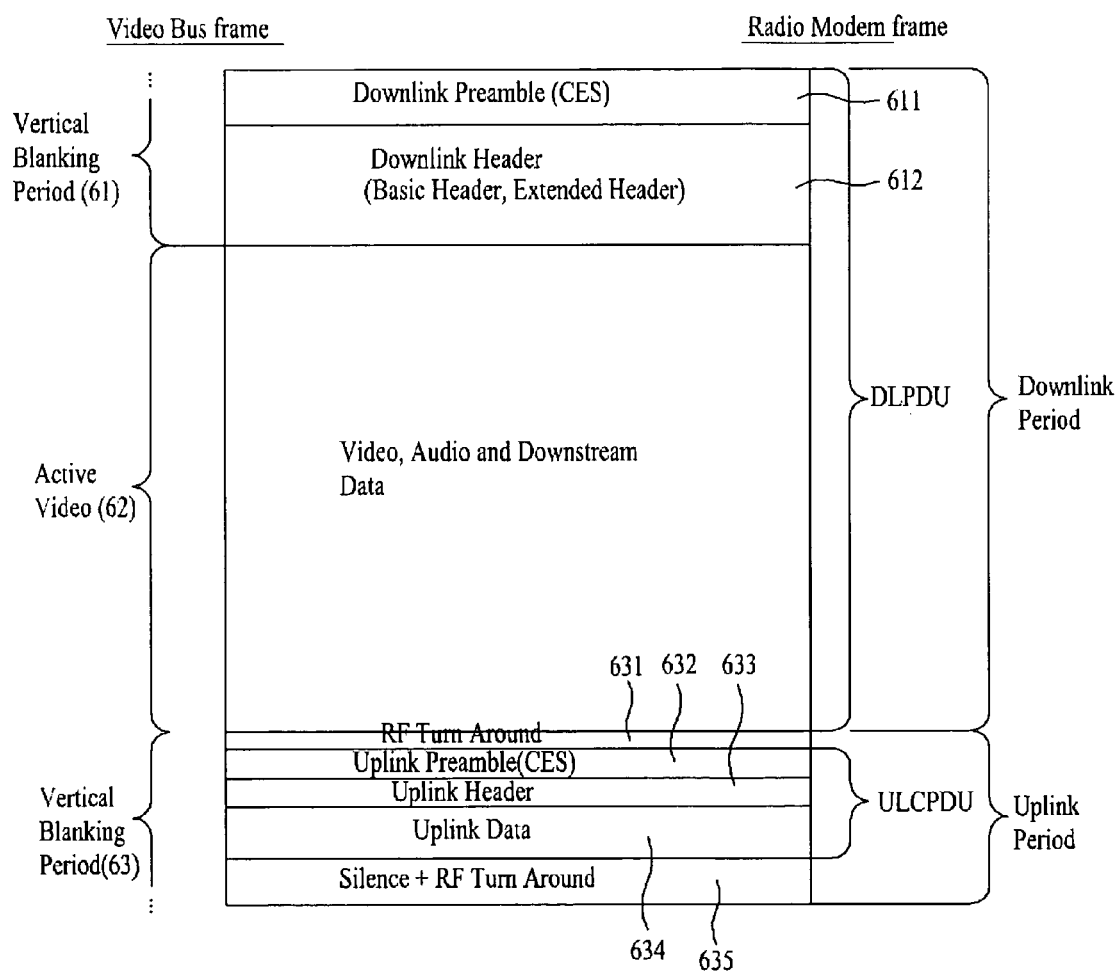
FIG. 6 is a timing flow chart illustrating a process of converting a general video signal including a vertical blanking period into an RF signal in a WHDI device which is transmitting and receiving A/V data.

FIG. 6 is a flow chart illustrating a process of converting a general video signal including a vertical blanking period into an RF signal in a WHDI device which is transmitting and receiving A/V data.

Generally, an interval where a source device continues to transmit a radio signal to a sink device will be referred to as a downlink interval. In the downlink interval, the source device transmits a downlink PHY data unit (DLPDU). The downlink interval can be divided into a vertical blanking period 61 and an active video period 62. First of all, the vertical blanking period 61 is divided into an interval 611 where the source device transmits a downlink preamble including channel estimation sequence (CES) to the sink device and an interval 612 where the source device transmits a downlink header to the sink device. The CES is a scheme that measures distortion of a received signal, which occurs as a transmitting signal passes through an unspecified radio channel, i.e., time delay, phase variation and attenuation by using a pilot signal included in the transmitting signal at a given pattern.

The WHDI source device which is transmitting and receiving A/V data can continue to transmit an control information corresponding to a radio signal and a signal having a bandwidth of 5 Ghz including video data for the downlink interval without seamlessness. The time required for the downlink interval corresponds to the time obtained by adding a part of the vertical blanking period of video bus (component, HDMI, LVTTL, etc.) to one of the active video period where actual video data are transmitted. In other words, the signal transmission time is determined in accordance with a type of data transmitted from the source device. In this case, for the downlink interval, the PHY signal can be transmitted in a unit longer than that of other RF communication as much as 10 ms or greater.

The downlink interval follows after the uplink interval. The uplink interval is an interval where the PHY layer of the sink device can transmit a radio signal to the source device. The uplink interval includes only a part 63 of the vertical blanking period of a video bus (component, HDMI, LVTTL, etc.). An uplink control PHY data unit (ULCPDU) corresponding to the uplink interval is divided into an RF turn around interval 631, an interval 632 for transmitting a preamble including CES, an interval 633 for transmitting an uplink header, an interval 634 for transmitting uplink data, and a silence and RF turn around interval 635.

The interval 632 for transmitting an uplink preamble including CES is a signal interval for synchronization of a device that receives an uplink radio signal. The silence and RF turn around interval 635 corresponds to the time required to convert a transmitting antenna to a receiving antenna or vice versa. Namely, the silence and RF turn around interval 635 is a temporary silence interval, and corresponds to the time required to convert a transmitting mode to a receiving mode in case of the sink device, and the time required to convert the receiving mode to the transmitting mode in case of the source device.

If the uplink interval ends, the preamble/CES transmission interval 611 and the downlink header transmission interval 612 of the downlink interval follow to fill the vertical blanking period 61.

In this way, the WHDI PHY layer which is transmitting A/V data can define the downlink transmission interval in accordance with time interval (i.e., interval between the vertical blanking period and the active video period) of an original signal (signal of wire bus) of video data which are transmitted. In the downlink and the uplink, OFDM and MIMO technologies are used for each transmission interval. However, different methods of generating and transmitting a PHY signal are used in the downlink and the uplink.

The source device configures its voice, video and control data through a DLPDU in the PHY layer using the downlink interval of the vertical blanking period 61 and the active video period 62 and then transmits the configured data to the sink device through the radio signal. The downlink interval is divided into a video dependent DLPDU mode for transmitting video data only and a video independent DLPDU mode for transmitting data having no relation with video data. Hereinafter, the video dependent DLPDU mode and the video independent DLPDU mode will be described with reference to FIG. 7 and FIG. 8.

Figure 7:
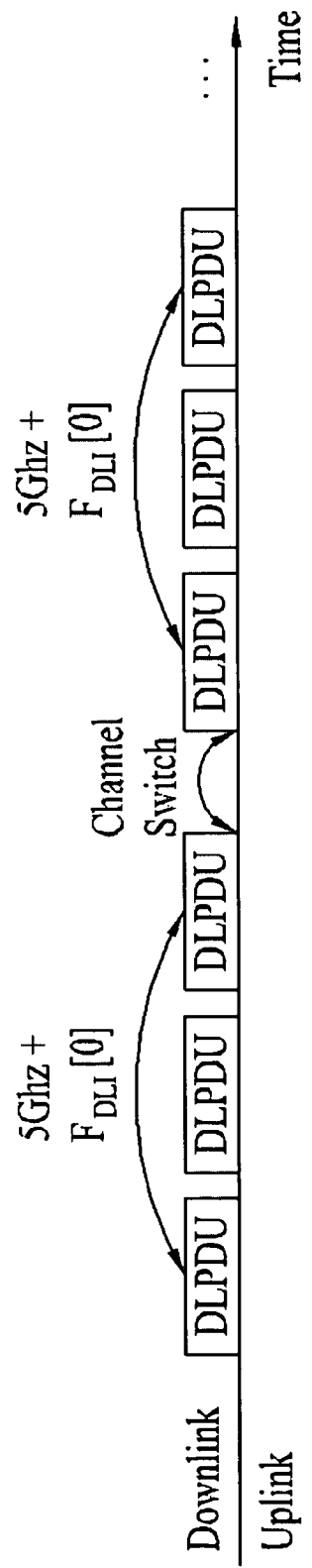
FIG. 7 is a diagram illustrating an example of a DLPDU sequence in case of a video independent DLPDU mode in a WHDI PHY layer.

FIG. 7 is a diagram illustrating an example of a DLPDU sequence in case of a video independent DLPDU mode in a WHDI PHY layer.

Referring to FIG. 7, the source device broadcasts its existence through the video independent DLPDU having no relation with A/V data to seek the sink device when the network starts. The video independent DLPDU is similar to a beacon message but is different from the beacon message in that time information for synchronization or control information such as a device list of the network is carried in the basic header (BH) and the extended header (EH) of the DLPDU so that the time information or the control information can be transmitted simultaneously with another kind of MAC command or AVC command. Another object of the video independent DLPDU is to allocate a short time period required to transmit an audio signal to the sink device. Since the video independent DLPDU does not need to synchronize with a video bus signal, it requires a relatively short time of 5 ms or less.

Referring to FIG. 7, when the source device transmits an independent DLPDU having no A/V data to seek the sink device, frequency $F_{DLI}[0]$ represents each central frequency range within the range of 5 Ghz U-NII. For example, $F_{DLI}[0]$ is 5150 Mhz and $F_{DLI}[1]$ is 5470 Mhz within the range of 5 Ghz U-NII. The source device broadcasts its information over all channels to allow the sink device in a standby mode for reception to respond to the broadcasted information.

Figure 8:
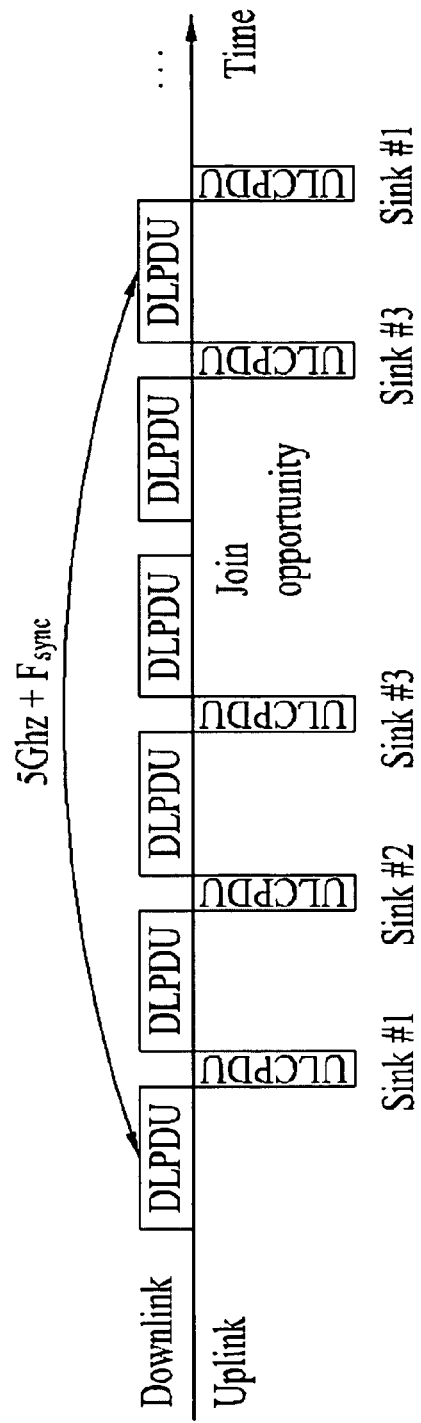
FIG. 8 is a diagram illustrating an example of a DLPDU sequence in case of a video dependent DLPDU mode in a WHDI PHY layer.

FIG. 8 is a diagram illustrating an example of a DLPDU sequence in case of a video dependent DLPDU mode in WHDI PHY layer.

Referring to FIG. 8, an object of the video dependent DLPDU is to allow the source device to synchronize its frequency with a video signal prior to a radio signal. For example, if the source device is transmitting a video signal of 1080 p 50 hz to the sink device using the downlink, a DLPDU signal is sustained for a time period of about 18 ms corresponding a signal interval when an active video signal, i.e., DE signal is on in the active source device. As illustrated in FIG. 8, if the interval where the first DLPDU is transmitted ends, a direction of a signal is changed and the first sink device transmits uplink control PHY data unit (ULCPDU) data to the source device using the uplink. Afterwards, if the ULCPDU signal is transmitted from the first sink device to the source device, next DLPDU signal is transmitted and the ULCPDU signal is transmitted from the second sink device to the source device. In this way, this process is repeated. Header information of the ULCPDU and the DLPDU is included in the vertical blanking period of the video signal. Namely, the sink device can transmit the PHY signal for a relatively short time of 500 us or less.

Figure 9:
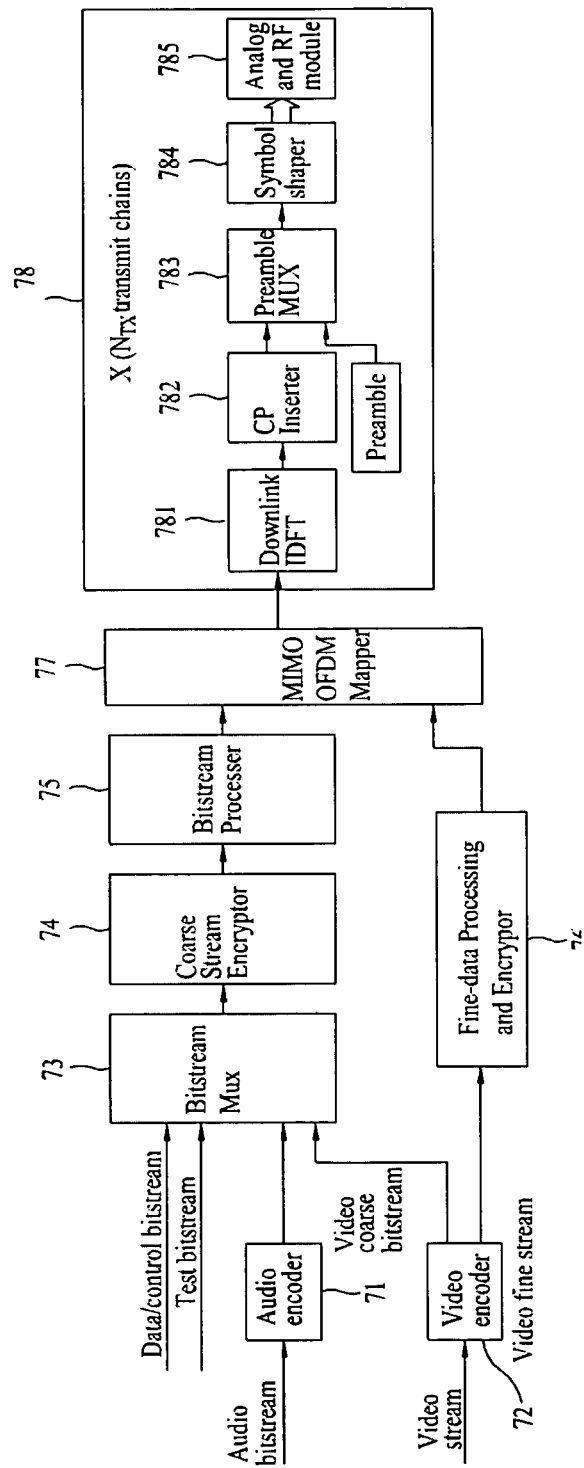
FIG. 9 is a diagram illustrating an example of PHY structure that transmits a DLPDU in a WHDI system.

FIG. 9 is a diagram illustrating an example of a PHY structure that transmits a DLPDU in a WHDI system.

In a DLPDU PHY structure of a WHDI active source device, a radio encoding process can be implemented in various manners in accordance with a type of data which will be transmitted. Particularly, in case of video data, each frame (for example, each image) is decomposed into one or more color components Y, Cb, Cr, and a frame of the decomposed color components is decomposed into frequency components and then quantized. In this case, a fine of the quantized result is split into video fine streams, and the quantized frequency components are split into video coarse bitstreams. A separate channel encoding process is applied to the video fine streams and the video coarse bitstreams even in case of the same video data.

Referring to FIG. 9, data transmitted in the WHDI DLPDU PHY structure are divided into data/control bitstreams which are message command data requested from the MAC layer and the AVCL, test bistreams which are given bit patterns mixed with data by the receiving side to verify signal accuracy, audio bitstreams transmitting audio data, and video bitstreams transmitting video data. The video bitstreams are subdivided into video coarse bitstreams transmitting quantized video data and video fine streams which are bitstreams of an error value corresponding to each of the quantized data.

The video coarse bitstreams are bitstreams of coefficients obtained by applying de-correlation transform (DCT) to video data and quantizing the video data. The video fine bitstreams are bitstreams of a quantizing error generated after DCT is applied to video data.

As described above, a method of generating a signal is varied depending on a type of data transmitted from the PHY system. Referring to an example illustrated in FIG. 9, audio data and video data go through encoders 71 and 72, respectively, and other control data such as data/control bitstreams and test bitstreams are transmitted to a bitstream MUX 73 without going through encoding. Among the video data, the video coarse bitstreams are transmitted to the bitstream MUX 73 after going through encoding, whereby a total of four signals are unified to form one bitstream. At this time, the video dependent DLPDU mode includes video coarse bitstreams but the independent DLPDU mode excludes the video coarse bitstreams.

Next, a coarse stream encryptor 74 encrypts all data excluding header information (BH and EH) from a signal input from the bitstream MUX 73 as one bitstream, in accordance with AES-128 mode. A bitstream processor 75 modulates the encrypted signal to a radio signal (symbol) based on a QAM mode and adds an error correction code.

Meanwhile, the video fine data are processed independently by a fine data processing and encryption module 78 to transmit data more safely unlike the aforementioned four data. At this time, the fine data processing and encryption module 76 includes a fine-data scaling module, a fine-data symbol mapper, a fine-data encryptor, and a fine-data scrambler.

In the aforementioned example, a total of five data gone through the aforementioned separate processing procedure are the video fine data gone through the fine data processing and encryption module 76 and the other four data unified into one data. These five data are input to a MIMO OFDM mapper 77. The MIMO OFDM mapper 77 distributes the input signal into the RF-chain module 78 through subcarreir or each transmitting antenna to apply MIMO based on antenna diversity, channel matrix calculation and DCT. In this case, each dedicated subcarrier can be allocated using carrier signals having different central frequencies for each of video coarse data and video fine data.

In the Nth transmit chains 78, a downlink IDFT unit 781 transforms each subcarrier signal which is finally calculated, on a time axis and unifies the subcarrier signals. A CP inserter 782 copies a block of a certain size at a rear part of a previous symbol into a front part of next symbol to avoid multi-path interference that may occur between OFDM symbols. A preamble Mux 783 performs signal realignment so that only preamble data are transmitted from the preamble transmission intervals 611 and 632 illustrated in FIG. 6. A symbol shaper 784 performs signal processing so that signal intensity in a frequency domain is within the range of a spectral mask requested by the WHDI system. The final signal is converted into an analog signal by a digital/analog converter of an analog and RF module 785, and the converted intermediate frequency (IF) is converted into a radio frequency (RF) signal of 5 Ghz through a mixer and then transmitted through an antenna.

The process of transmitting audio signal and video signals through an antenna in the DLPDU PHY structure of the WHDI system has been described as above.

In short, the active source device of the WHDI system always performs DCT for video data directly input from the PHY layer before transmitting the radio signal. As the DCT video data are quantized, transmission data are compressed, whereby more data are transmitted within a limited bandwidth. The quantized video data are split into video coarse data and video fine data, to which separate error correction encoding processes are applied. Alternatively, separate modulation modes can be applied to the video coarse data and the video fine data.

Hereinafter, each element in a subsystem of a DLPDU PHY layer of a WHDI active source device will be described in more detail.

Figure 10:
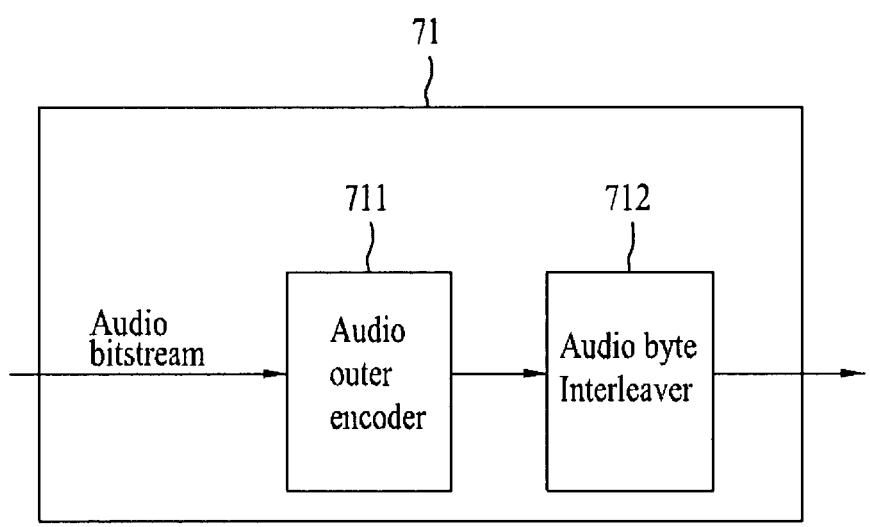
FIG. 10 is a diagram illustrating a structure of an audio encoder in an example of a DLPDU PHY structure of a WHDI active source device.

FIG. 10 is a diagram illustrating a structure of an audio encoder in an example of a DLPDU PHY structure of a WHDI active source device.

Referring to FIG. 10, the audio encoder 71 includes an audio outer encoder 711 and an audio byte interleaver 712. The audio outer encoder 711 uses a Reed-Solomon mode as preprocessing of audio data. In this case, a polynomial, $P(x) = 1+x^2+x^3+x^4+x^8$, is used. For example, equivalent data of 16 bytes are added to data of 239 bytes, whereby data of a total of 255 bytes are generated. These resultant data values are again interleaved by a convolutional byte-interleaver of an audio byte interleaver 712. In this case, distortion of an audio signal such as a radio error, can be reduced.

Figure 11:
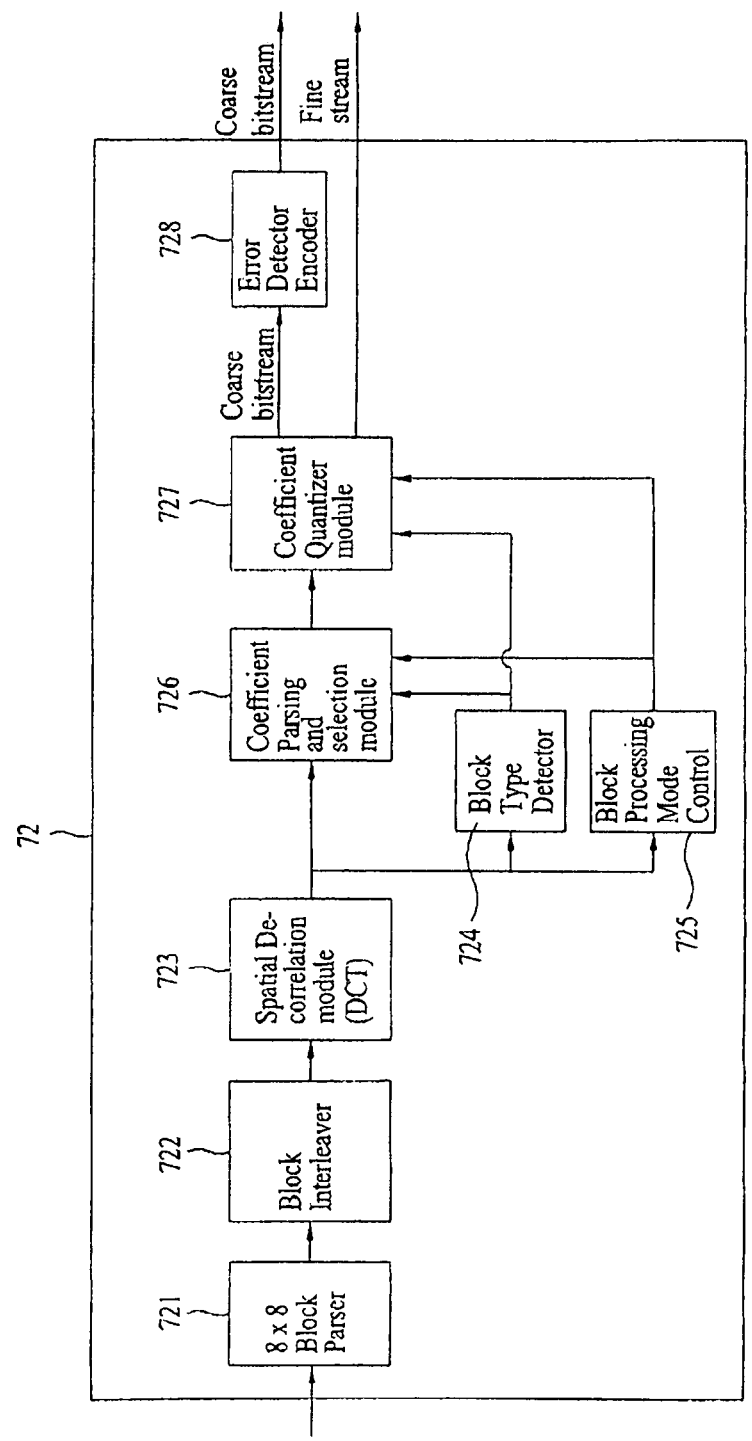
FIG. 11 is a diagram illustrating a structure of a video encoder in an example of a DLPDU PHY structure of a WHDI active source device.

FIG. 11 is a diagram illustrating a structure of a video encoder in an example of a DLPDU PHY structure of a WHDI active source device.

The video encoder 72 performs DCT for uncompressed video data (for example, pixel) of Y, Cb, Cr types using a frequency domain, divides the transformed signal into a DC component and an AC component, quantizes the components, and extracts errors generated during a quantizing process as video fine streams. The video encoder 72 extracts the quantized value as video coarse streams. After performing DCT using a frequency domain, the video encoder 72 selects high energy coefficients of low frequency components as much as available transmission capacity measured in the MAC layer and transmits the selected high energy coefficients to a unit for next process and discards the other signals.

In more detail, referring to FIG. 11, for DCT of video data, all pixels are grouped into a block of 8×8 by a block parser 721. For example, if block grouping is performed for pixels of 1920×1080 full HD size, the pixels can be grouped into a block of 240×135. Since grouping is performed in a block of 8×8, buffering should be performed in such a manner that horizontal blanking of a video bus is stored in a video memory of a transmitting side at least eight times.

Figure 12:
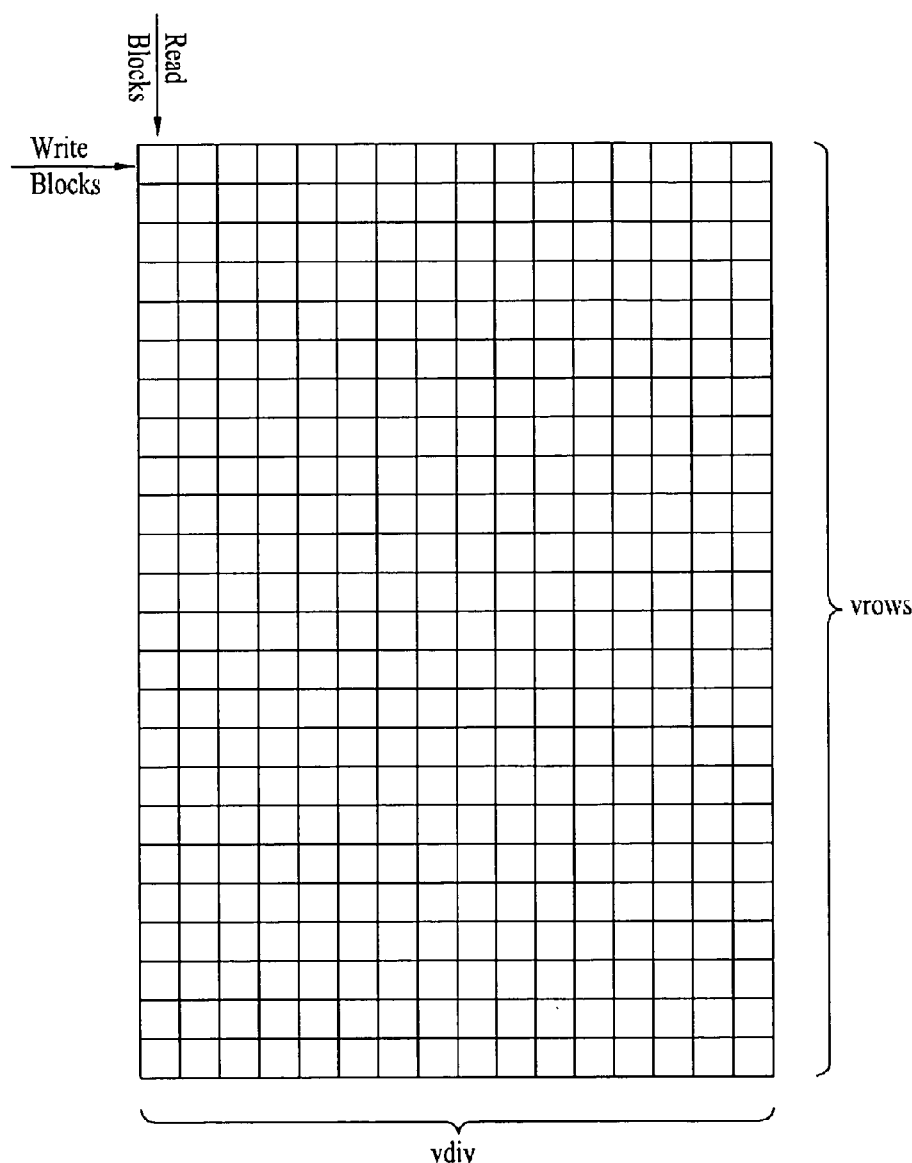
FIG. 12 is a diagram illustrating an example of block interleaving performed by a video encoder of FIG. 11.

A block interleaver 722 interleaves columns and rows as illustrated in FIG. 12 for blocks of 240×135 or some blocks in the whole screen of 1920×1080 full HD size, for example, to avoid a burst error. FIG. 12 is a diagram illustrating an example of block interleaving performed by a video encoder of FIG. 11.

A spatial de-correlation module 723 that performs DCT transforms each block where columns and rows are permutated by the block interleaver 722, into frequency components through DCT. Namely, to generate a set of coefficients for each block, the spatial de-correlation module 723 performs spatial de-correlation within each block. Spatial de-correlation is varied depending on a value of a coefficient corresponding to the signal transformed into frequency components. Referring to FIG. 11, the signal transformed into frequency components is input to a coefficient parsing and selection module 726 that parses and selects coefficients, in accordance with coefficient values, or input to the coefficient parsing and selection module 726 through a block type detector 724 that determines a type of each block and a block processing mode controller 725 that controls a processing mode of each block.

The block type detector 724 detects a type of each video block. At this time, two block types are defined: type 0 and type 1. Typically, after DCT, blocks with low energy at their high frequency coefficients are of type-0, while blocks with high energy at their high frequency coefficients are of type-1. The specific block type decision rule may be implementer specific as long as the video quality requirements are met.

A block processing mode controller 725 performs a processing mode for all blocks by using either a first mode or a second mode. The first mode is a basic mode and is intended for all blocks, while the second mode is a refinement mode and is intended for blocks which do not change throughout a number of consecutive video frames. The specific block processing mode decision rule may be implementer specific as long as the video quality requirements are met. The first mode applies a quantizing process by selectively discarding high frequency components from the DCT video signal, and can generate relatively small video data. On the other hand, in the second mode, high frequency components are discarded from the DCT video signal, and relatively many video data can be transmitted through quantizing and error signal extracting processes. However, to apply the second mode when the source device transmits video data, the sink device should support the second mode that is the refinement mode. If the second mode and no process of discarding high frequency components is applied to all blocks, uncompressed transmission can be performed.

The coefficient parsing and selection module 726 parses and selects video coarse stream coefficients of each block based on the block type detected by the block type detector 724, block processing mode control indication performed by a block processing mode controller 725, a coefficient information table for selecting a proper coefficient, and available bandwidth provided by the MAC layer.

$N_{Coeffs\_per\_Block}$ is set by the MAC layer. $N_{Coeffs\_per\_Block}$ is a coefficient value per block and is determined by considering current radio receiving sensitivity and other throughput values. For example, if a radio channel status is not good due to a long distance between the source device and the sink device, $N_{Coeffs\_per\_Block}$ is set to have a small value, whereby all other coefficients corresponding to high frequency components shall be discarded.

A coefficient quantizer module 727 performs quantization for signals transmitted from the block type detector 724, the block processing mode controller 725, and the coefficient parsing and selection module 726. To generate video coarse bitstreams and video fine bitstreams of complex symbol values, the coefficient quantizer module 727 can quantize coefficients of each block based on the type of each block, a detailed control indication information, proper quantizing table, and available bandwidth provided by the MAC layer.

A subset of the DCT coefficients is quantized for each video block. Each coefficient that is quantized produces two outputs: a video fine coefficient and a sequence of one or more quantization bits. The coefficients that are not quantized remain unchanged and are hereinafter referred to as video fine coefficients.

The quantizing process performed by the coefficient quantizer module 727 shall be supported as follows:

1) 9 different uniform quantizers that may be used for the DC DCT coefficients (i.e. $X^D[0,0]$). Each quantizer is specified by the number of its output bits; and 2) 3 different non-uniform quantizers that may be used for the non-DC DCT coefficients, i.e., AC components (i.e. $X^D[k,l]$ k=0,1,2,...,7 l=0,1,2,...,7 {k,l}≠{0,0},). Each quantizer is specified by the number of its output bits.

Each N-bit coefficient quantizer is defined by $2^N$ quantization value and $2^N$ quantization regions; the $2^N$ quantization values, each corresponding to one quantization region, and the $2^N$ quantization regions including $2^N$ N-bit sequences, each corresponding to one quantization region. It is supposed that the DCT-coefficient is quantized by $X^D$, and the quantization is quantized by an N-bit quantizer by:

$$X^D \xrightarrow{N} \{\tilde{X}^D, b_0 b_1 \ldots b_{N-1}\}.$$

The quantization process is done as follows:

1) find the quantization region $r^i$ within which the coefficient $X^D$ is lying. Mathematically this is done according to:

$$X^D \xrightarrow{N} r^i \text{ iff } R^i_{min} \le X^D < R^i_{max}$$

where iff means if and only if;

2) quantize the coefficient $X^D$ to produce the quantization value $q(X^D)$ corresponding to the quantization region $r^i$;

3) generate the N-bit sequence $b_0 b_1 \ldots b_{N-1}$ corresponding to the quantization region $r^i$. This N-bit sequence is the bit sequence output of the quantization process with the output bit $b_0$ being the earliest in the stream; and 4) calculate the quantization error defined by: $\tilde{X}^D = X^D - q(X^D)$. This quantization error is the video fine coefficient output of the quantization process.

For the coefficients that are not quantized, $\tilde{X}^D = X^D$, and no bit sequence is generated.

Hereinafter, the quantization bits produced for each video block will be described with reference to FIG. 13. FIG. 13 is a diagram illustrating quantization bits produced for each video block in a DLPDU PHY structure of a WHDI active source device.

The selection of the quantized coefficients and the number of bits are allocated depending on the first block mode (basic mode) or the second block mode (refinement mode), video format and Bandwidth limitations. For blocks processed with the second mode, all quantization bits are set to 0.

For every block, the number of total quantization bits is $N_{Bits\_per\_Block}$ as set by the MAC layer. The MAC layer also provides the parameter $N_{Bits\_fraction}$ with a value greater or equal to 0 and smaller than 64. This value is used for rate adjustment, by appending a single '0' valued bit to the first $N_{Bits\_fraction}$ video blocks output within every group of 64 video blocks. At this time, rate adjustment starts from the first video block, by attaining a constant bit rate when averaging over groups of 64 blocks. This bit is referred to as "rate adjustment bit". The rate adjustment bit, if added, is added after all quantization output bits of the block. The bits generated for each video block shall further be prepended by a "type bit", indicating the type of the video block. The type bit shall precede any quantization bit and rate adjustment bit (if produced). The type bit shall take the value '0' for type 0 blocks, and the value '1' for type 1 blocks.

The type bit, quantization bits, and rate adjustment bit (if added) shall be further prepended by a "processing bit", indicating the processing of the video block. The processing bit shall be set to 0 by the source device for all blocks when a signal is transmitted to a sink that does not support the second mode.

After the quantizing process is performed, the video fine streams are extracted, which correspond to the difference between the quantized coefficient and a previous value before quantization.

The bitstream MUX 73 multiplexes the four bitstreams (data/control bitstream, audio encoder output bitstream, video coarse bitstream, test bitstream) for further processing as one coarse stream. At this time, the header information (BH, EH) is excluded from the control information. The coarse stream encryptor 74 encrypts video coarse streams excluding header information (BH, EH) processed as one stream by the bitstream MUX 73.

The bitstream processor 75 will be described with reference to FIG. 14.

Figure 14:
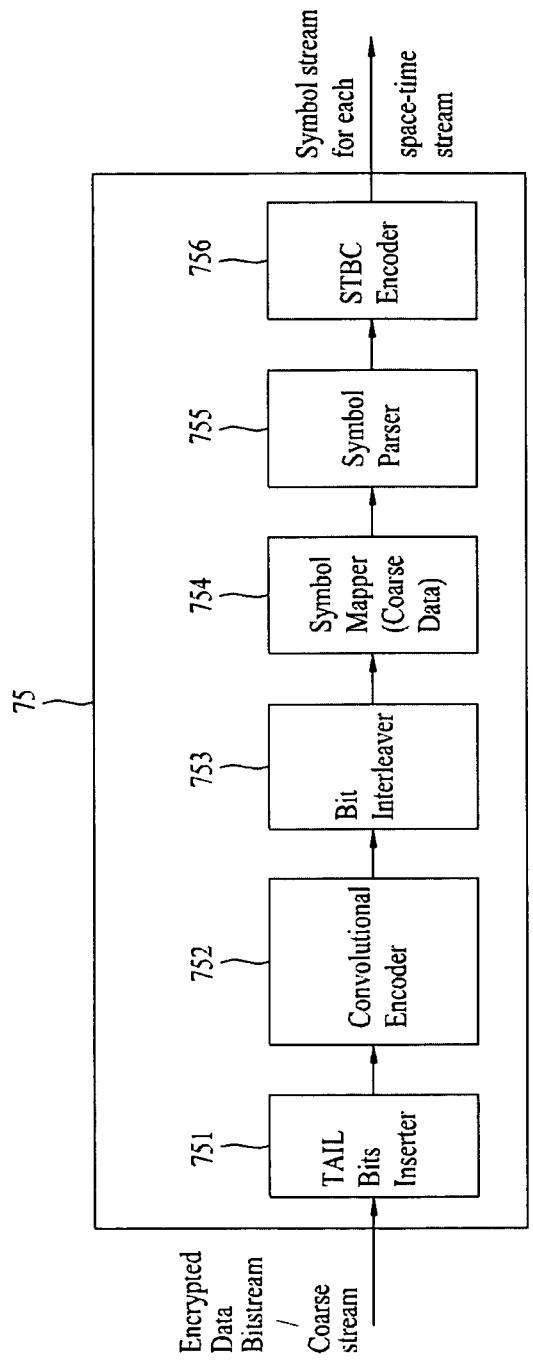
FIG. 14 is a diagram illustrating a bit stream processor in an example of a DLPDU PHY structure of a WHDI active source device.

FIG. 14 is a diagram illustrating a bit stream processor in an example of a DLPDU PHY structure of a WHDI active source device.

The bitstream processor 75 includes a TAIL bits inserter 751, a convolution encoder 752, a bit interleaver 753, a symbol mapper 754, a symbol parser 755, and a space time block code (STBC) encoder 756.

The video coarse streams are transmitted with an error correction code more reinforced than that of the video fine streams. Referring to FIG. 14, the convolution encoder 752 and the STBC encoder 756 add the error correction code to the video coarse streams. At this time, in addition to the video coarse bitstreams, other data streams gone through the encryption process by being multiplexed by the bitstream MUX 73 also go through the bitstream processor.

Figure 15:
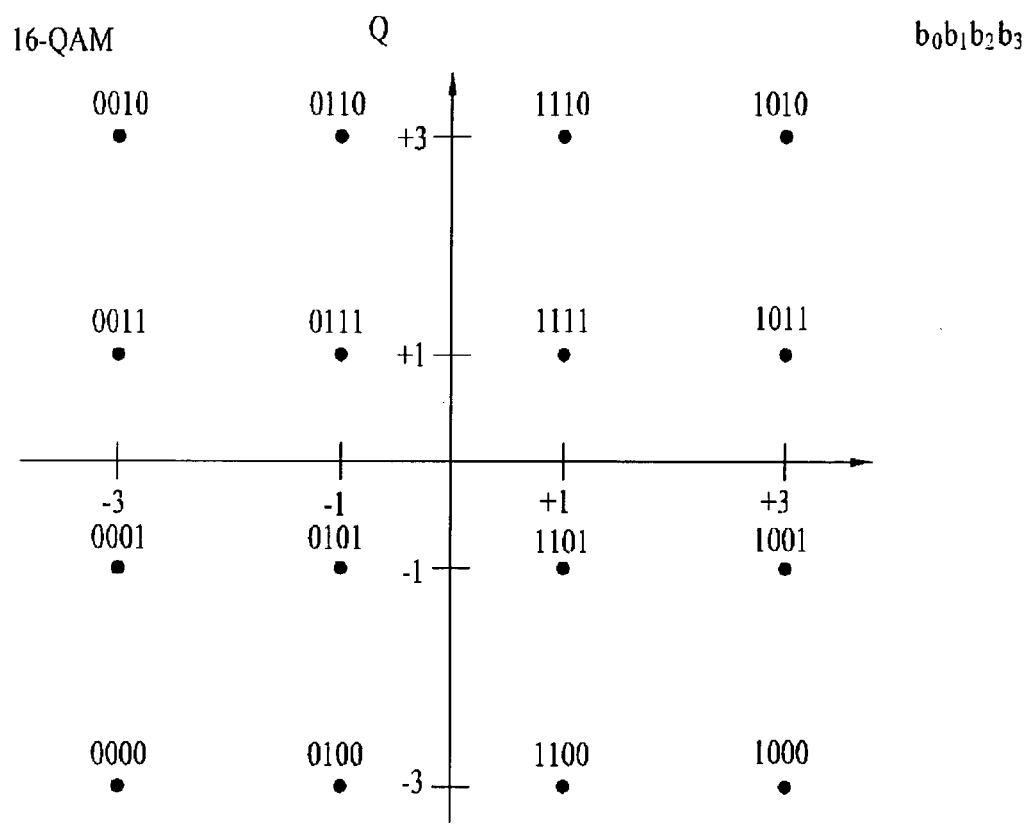
FIG. 15 is a diagram illustrating 16 QAM arrangement of video coarse streams for conversion to IQ orthogonal phase coefficients in an example of a DLPDU PHY structure of a WHDI active source device.

The TAIL bits inserter 751 adds the last bit '0' to receive the input of the convolution encoder. Encoding rates of 1/2, 3/4 and 5/6 are used by each encoder. The encoding rate can be varied depending on the radio status. For example, the encoding rate of 1/2 is used if the radio status is good, and 5/6 is used if not so. The bitstreams gone through the convolution encoder 752 are spread together with adjacent bits by the bit interleaver 753. The symbol mapper 754 converts the video coarse bitstreams into IQ orthogonal phase coefficients for conversion to analog signals. As illustrated in FIG. 15, bitstreams of the video coarse streams can always be encoded by only 16-QAM.

FIG. 15 is a diagram illustrating 16 QAM arrangement of video coarse streams for conversion to coefficients of IQ orthogonal phase in an example of a DLPDU PHY structure of a WHDI active source device. In 16 QAM, four bitstreams are converted into one symbol.

Figure 16:
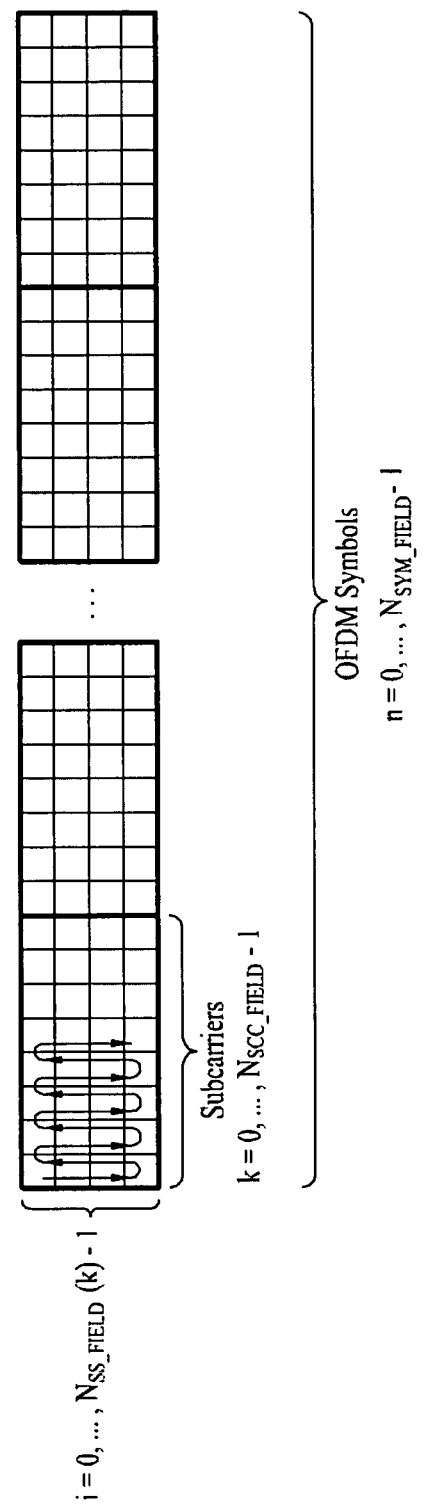
FIG. 16 is a diagram illustrating an example of a process of parsing OFDM symbols in a symbol parser in an example of a DLPDU PHY structure of a WHDI active source device.

FIG. 16 is a diagram illustrating an example of a procedure of parsing OFDM symbols in a symbol parser in an example of a DLPDU PHY structure of a WHDI active source device.

A DLPDU symbol parser 725 distributes 16-QAM symbols to demodulated symbol streams in the order of subcarriers allocated to the video coarse streams and spatial streams (transmit chain).

The DLPDU uses a plurality of spatial streams due to its more transmission rate (200 Mbps or greater in case of 1080 p) than that of uplink data. Referring to FIG. 16, the DLPDU symbol parser 725 converts input streams of IQ complex signals into vectors such as OFDM symbols, subcarriers, and spatial streams.

For example, it is supposed that four MIMO channels, Nsym number of OFDM symbols, and Nscc number of subcarriers exist. In this case, <OFDM symbol#1, Subcarrier#1, Spatial Stream#1> <OFDM symbol #1, Subcarrier #1, Spatial Stream #2> <OFDM symbol #1, Subcarrier #1, Spatial Stream #3> <OFDM symbol #1, Subcarrier #1, Spatial Stream #4> <OFDM symbol#1, Subcarrier #2, Spatial Stream #1> <OFDM symbol #1, Subcarrier #2, Spatial-Stream #2> . . . <OFDM symbol #2, Subcarrier #1, Spatial-Stream #1> <OFDM symbol#2, Subcarrier#1, Spatial-Stream#2> . . . <OFDM symbol#Nsym, Subcarrier#Nscc, SpatialStream#3> <OFDM symbol#Nsym, Subcarrier#Nscc, SpatialStream#4> are sequentially allocated to input data, Complex 0, Complex 1, . . . , Complex T, . . . .

The STBC encoder 756 adds repeated error correction code to each spatial stream to reinforce error correction possibility.

Hereinafter, fine data processing and encryption performed by the fine data processing and encryption module 76 will be described with reference to FIG. 17.

Figure 17:
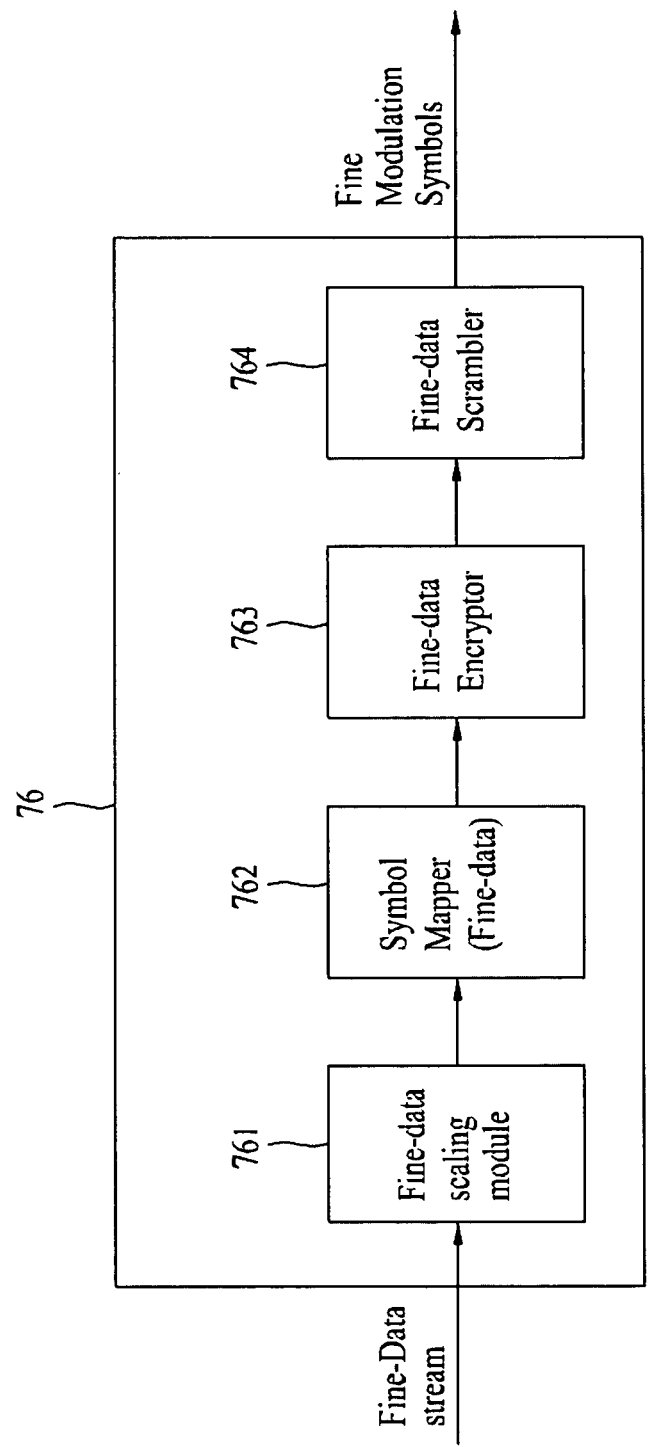
FIG. 17 is a diagram illustrating a fine data processing and encryption module in an example of a DLPDU PHY structure of a WHDI active source device.

FIG. 17 is a diagram illustrating a fine data processing and encryption module in an example of a DLPDU PHY structure of a WHDI active source device.

The video fine data streams gone through the video encoder 72 go through fine data scaling in the fine data processing and encryption module 76. A fine-data scaling module 761 where fine data scaling is performed uses a variable scaling elements depending on whether each video block grouped into 8×8 is type 0 or type 1. For example, all fine data included in the video block of type 0 are multiplied by 1.75, while all fine data included in the video block of type 1 are multiplied by 1. In this way, scaling is performed.

Afterwards, the scaled video data go through symbol mapping in the symbol mapper 762. Fine data modulation is different from general digital/analog modulation (BPSK, QPSK, QAM). First of all, one fine data stream is grouped into two fine data, for example, fine data of Y component in one pixel and fine data of Chroma component. As one fine data stream is divided into two groups, one modulation symbol includes two fine data after the fine data processing encryption procedure is completed. The first fine data has a real number value, and the second fine data has an imaginary value. In the modulation process, a symbol ± is used as it is before modulation is performed, and modulation is performed using an orthogonal phase carrier complex mode. For example, when each IQ has a size of ±2047 and a maximum available value of fine data is 1007.5, the first data is +22 and the second data is −24. In this case, IQ is given as follows: I=(22*2)+32=76, Q=(−24*2)+32=−80. This is advantageous in that twice more data than those of the fine data stream modulation mode such as 16 QAM and 64 QAM can be expressed in one symbol. As described above, when fine data are modulated in the active source device, one of fine data elements corresponding to Y, Cb, Cr components of one pixel is not decomposed into components I and Q. Instead, one of fine data elements is connected with I component and the other fine data element is connected with Q component.

Afterwards, the fine data encryptor 763 encrypts the symbols gone through the modulation process as complex input signals using AES-128 CTR in accordance with a key set in the fine data encryptor. The encrypted complex output signals are scrambled by a fine data scrambler 764 to avoid burst error.

The MIMO-OFDM mapper 77 maps coarse-data complex valued symbols, fine-data complex valued symbols, fixed pilots, and moving pilots into appropriate space time streams, subcarriers, and OFDM symbols. The MIMO-OFDM mapper 77 also allocates a specific subcarrier as a subcarrier for the fixed pilots and the moving pilots, whereby the receiving side performs time synchronization or channel measurement using the subcarrier.

The preamble MUX 783 performs multiplexing between the preamble field and all other (CES, BH, EH, IQ, DATA) fields, thus generating the entire DLPDU. During the time designated for preamble field, the preamble MUX 783 selects as input the preamble, whereas during the time designated for other fields (CES, BH, EH, IQ, DATA), the preamble MUX 783 selects as input, the output of the OFDM modulator.

Figure 18:
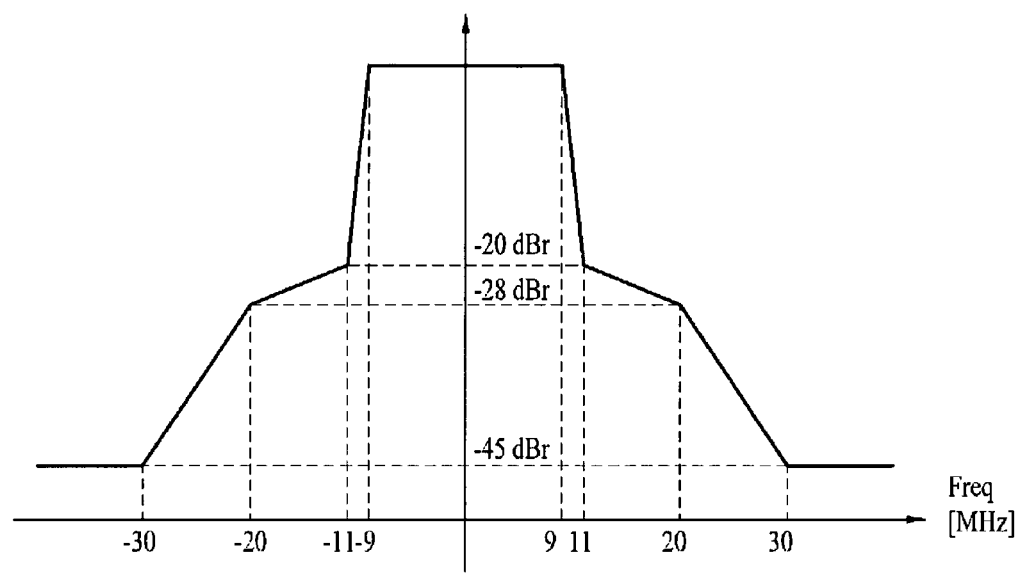
FIG. 18 is a diagram illustrating an example of a spectrum during DLPHY RF transmission in a WHDI active source device.

The symbol shaper 784 performs symbol shaping such that the spectral mask as defined in FIG. 18 is met.

FIG. 18 is a diagram illustrating an example of a spectrum during DLPHY RF transmission in a WHDI active source device.

The overall transmitted Baseband signal is composed of the contribution of all the fields, and fulfills the following Equation 1.

$$r^{(iTx)}_{DLPDU}(t) = r^{(iTx)}_{Pre}(t) + r'^{(iTx)}_{CES}(t-t_{CES}) + r'^{(iTx)}_{BH}(t-t_{BH}) + r'^{(iTx)}_{BH}(t-t_{EH}) + r'^{(iTx)}_{IQ}(t-t_{IQ}) + \tilde{r}^{(iTx)}_{DATA}(t-t_{DATA}),$$ [Equation 1], where $r'^{(iTx)}_{CES}(t)$, $r'^{(iTx)}_{BH}(t)$, $r'^{(iTx)}_{EH}(t)$, $r'^{(iTx)}_{IQ}(t)$ are filtered versions of $r^{(iTx)}_{CES}(t)$, $r^{(iTx)}_{BH}(t)$, $r^{(iTx)}_{EH}(t)$, $r^{(iTx)}_{IQ}(t)$, respectively. The DLPHY signal generated by the symbol shaper 784 has a frequency feature of a maximum spectral mask as illustrated in FIG. 18.

Next, the uplink where the PHY signal is transmitted from the WHDI system to the sink device or from the passive source device to the active source device will be described.

As described above, the active source device transmits video data or audio data to one or more devices, and the passive source device is additionally connected with the active source device without transmitting video data. The sink device receives video data or audio data from the active source device. Hereinafter, it is regarded that the sink device includes the active source device.

In the PHY interval, the uplink interval is divided into a mode that generates an uplink independent PHY data unit (ULIPDU) and a mode that generates an uplink control PHY data unit (ULCPDU).

The ULIPDU transmits a signal intended to notify its existence while circulating several channels within a 5 Ghz UNII band to detect the source device in a state that the sink device is connected with a specific source device but is not connected with the MAC layer. The ULCPDU corresponds to a PHY mode where the radio device connected with the active source device transmits a control signal to another device using a short time by avoiding the DLPDU, as described with reference to FIG. 7.

Hereinafter, generation of ULIPDU will be described with reference to FIG. 19 to FIG. 23.

Figure 19:
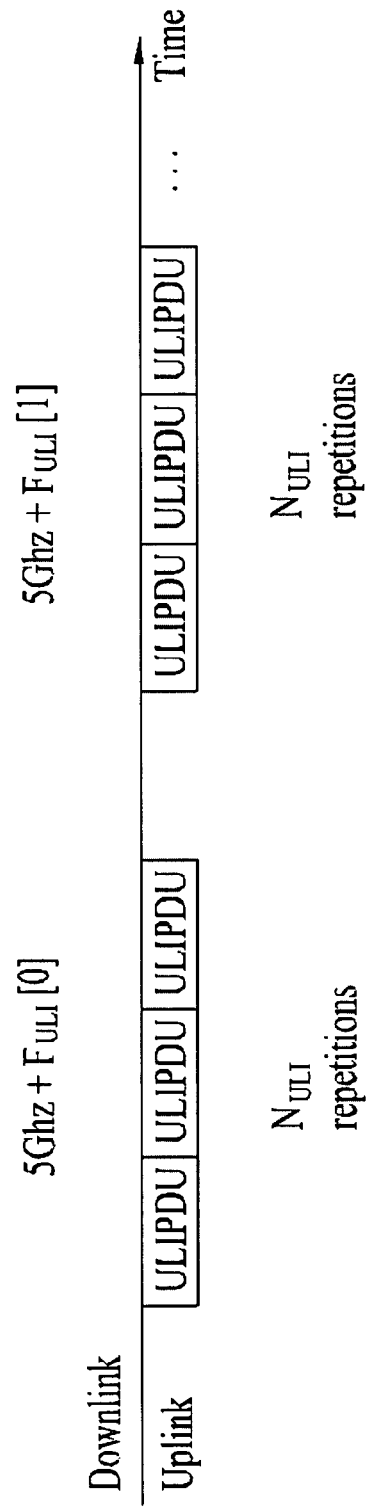
FIG. 19 is a diagram illustrating an example of ULIPDU transmission from a sink device to a source device in a WHDI system.

FIG. 19 is a diagram illustrating an example of ULIPDU transmission from a sink device to a source device in a WHDI system.

The ULIPDU is similar to the video independent DLPDU having no relation with video data, and has a relatively long signal time. The ULIPDU consecutively transmits several signals or repeatedly transmits the signal with a short pause time, and then receives a response to the transmitted signal. As illustrated in FIG. 19, after transmitting 8750 ULIPDU signals of 400 uS for 3500 msec, the ULIPDU waits for a signal response for 400 ms and again transmits a set of 8750 same ULIPDU signals. Namely, a group of the sink devices of the ULIPDU forms one $T_{uli}$ period and guides a response of the source device while circulating a 5 Ghz U-NII frequency band such as Fuli[0] and Fuli[1].

Figure 20:
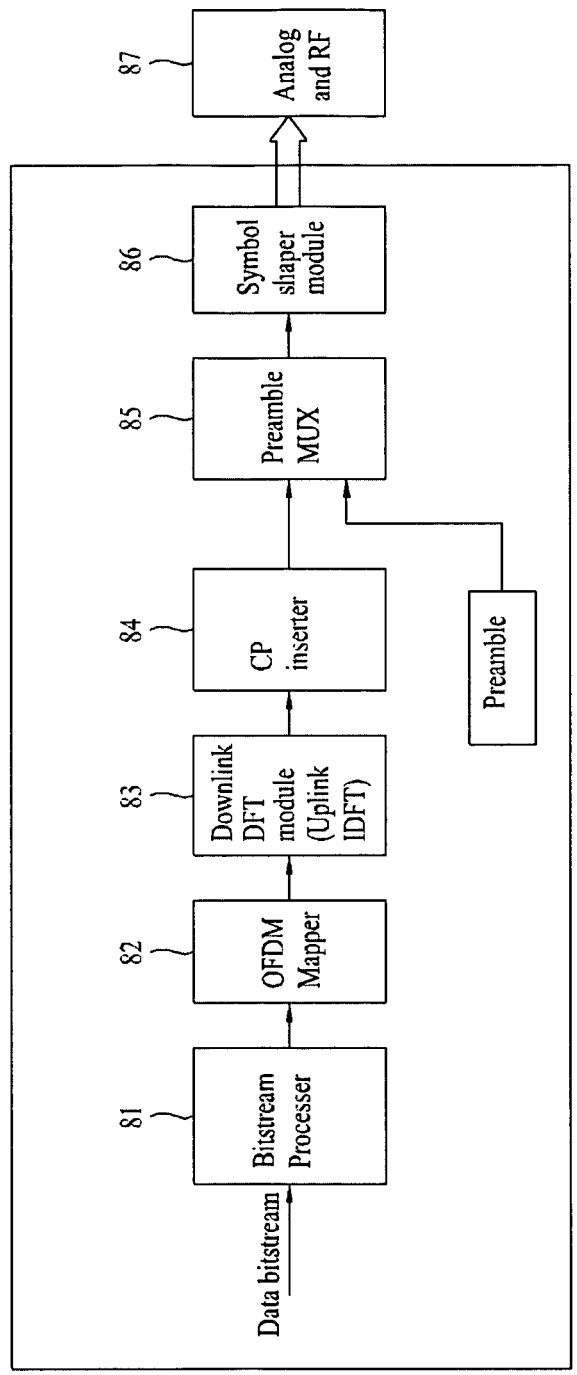
FIG. 20 is a block diagram illustrating a transmitting device that performs ULIPDU transmission to a receiving device in a WHDI system.

FIG. 20 is a block diagram illustrating a transmitting device that performs ULIPDU transmission to a receiving device in a WHDI system.

The transmitting device that transmits ULIPDU includes a bitstream processor 81, an OFDM mapper 82, an uplink IDFT (downlink DFT) module 83, a CP inserter 84, a preamble MUX 85, a symbol shaper module 86, and an analog and RF module 87. Each element processes only data not audio data or video data. The data transmitted through the ULIPDU includes device ID (6 bytes value), ID of a device intended to seek, and vendor ID.

In an address system of WHDI, each device has its unique ID. Device ID is a MAC address of 6 bytes, which can identify each of all WHDI devices. Generally, if it is supposed that WHDI-HDMI bridge (adaptor) is a basic device, a device attached to the basic device is referred to as a sub device (for example, DVD, STB, Blueray, etc.), and 1 byte address called LSA(logical sub-address) is added to each sub device. If a network is connected with each WHDI device, 1 byte address called ANA(active network address) is added to each WHDI device. In this way, each device can be identified based on a device address system comprised of device ID, LSA, and ANA.

Figure 21:
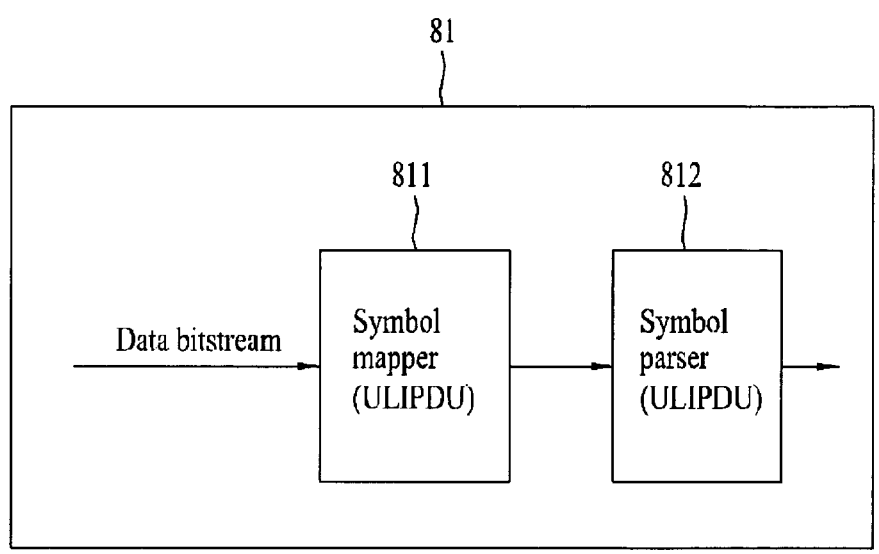
FIG. 21 is a diagram illustrating a bit stream processor of a transmitting device that performs ULIPDU transmission in a WHDI system.

FIG. 21 is a block diagram illustrating a bit stream processor of a transmitting device that performs ULIPDU transmission in a WHDI system.

Referring to FIG. 21, the ULIPDU bitstream processor 81 includes a symbol mapper 811 and a symbol parser 812. ULIPDU data modulation is performed by the symbol mapper 811 using on-off keying (OOK). For example, if one phase carrier is used, carrier scale (intensity) becomes 0 when an input bit is 0 and becomes $\sqrt{2}$ when an input bit is 1. The modulated symbol (complex signal) is allocated to each OFDM symbol through the symbol parser 812. One OFDM symbol can allocate complex signal inputs equivalent to the number of subcarriers. The ULIPDU is transmitted to one spatial stream and one space time stream without using multi-antenna technology such as MIMO and STBC. The number of subcarriers of the ULIPDU OFDM is relatively smaller than that of subcarriers of DLPDU OFDM. This is because that a required data rate of a control signal is smaller than 1 Mbps as compared with a data rate of 200 Mbps or greater required for video data transmission of 1080 p or greater.

The OFDM mapper 82 maps data complex valued symbols and pilots into appropriate subcarriers and OFDM symbols. The OFDM mapper 82 may also generate the pilots.

In the WHDI system, the ULIPDU DFT module 83 substantially has a function of DFT/IDFT, and operates as DFT during reception in the downlink while operates as IDFT during transmission in the uplink. Namely, based on the sink device, the ULIPDU DFT module 83 operates as IDFT during transmission while operates as DFT during reception.

The ULIPDU CP inserter 84 adds a cyclic period to a transmission procedure of a signal transformed by IDFT to avoid multi-path interference between OFDM symbols. The ULIPDU preamble MUX 85 performs multiplexing between the preamble field and all other (CES, DATA) fields, thus generating the ULIPDU. During the time designated for preamble field, the ULIPDU preamble MUX 85 selects as input the preamble, whereas during the time designated for CES and DATA fields, the ULIPDU preamble MUX 85 selects as input, the output of the OFDM modulator.

Figure 22:
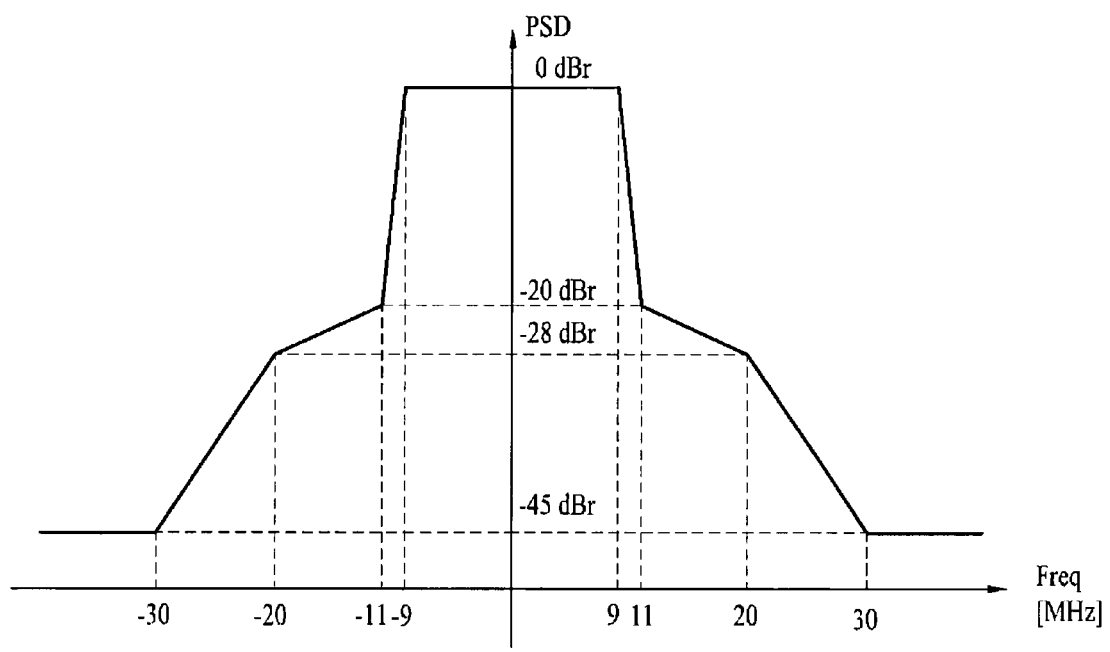
FIG. 22 is a diagram illustrating a transmission spectrum in case of 20 Mhz in a WHDI ULIPDU.

Afterwards, symbol shaping is performed by the ULIPDU symbol shaper module 86 such that the spectral requirements as defined in FIG. 22. FIG. 22 is a diagram illustrating a transmission spectrum in case of 20 Mhz in a WHDI ULIPDU.

Next, ULCPDU in the uplink will be described with reference to FIG. 23 to FIG. 25.

Generally, the PHY is designed to provide robustness and flexibility in order to support data rates of up to 100 kbps as well as for optimal operation in various home and office use case scenarios. This is achieved using various signal processing tools including OFDM modulation and frequency diversity. Two bandwidth modes, 20 MHz bandwidth mode and 40 MHz bandwidth mode can be used for PHY transmission. The two bandwidth modes are mandatory to supports for all WHDI devices.

In each bandwidth mode, shared medium and coexistence with other devices in the 5 GHz band is an important issue for maintaining high performance as well as avoiding interference to/from other systems. The ULCPDU modulation has been designed to coexist with existing devices. This coexistence is achieved by several means including carrier sense (CS), automatic frequency selection (AFS) and transmission power control (TPC).

The ULCPDU is an interval where the PHY for WHDI wireless transmission transmits data/control information from the sink device to the source device or the passive source device to the active source device using the uplink. Namely, the ULCPDU is a PHY signal sent, after the sink device receives the DLPDU from the active source device, from the sink device or the passive source device to another active source device, another sink device or another passive source device, to transfer the control message. The sink device or the passive source device fixes a channel and transmits the ULCPDU after finding the active source device.

Figure 23:
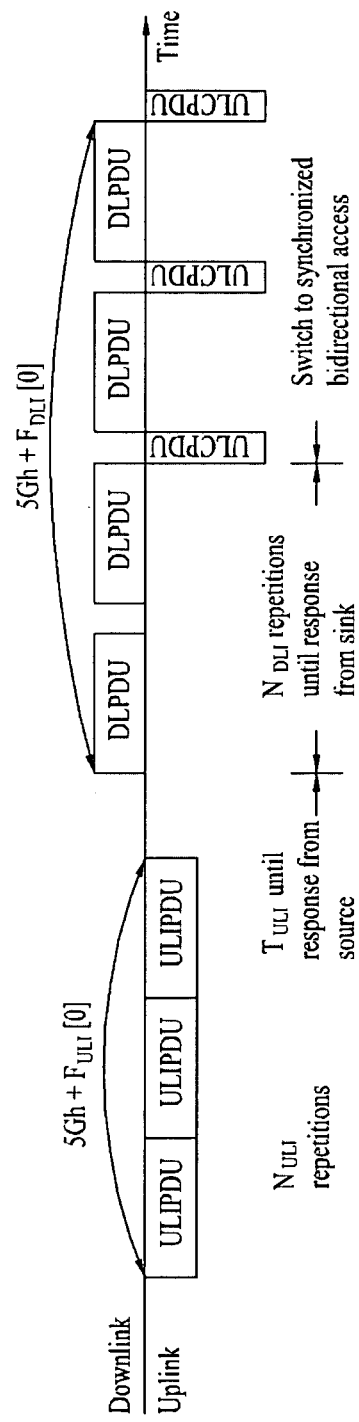
FIG. 23 is a diagram illustrating a video dependent timing relation between DLPDU and ULCPDU in a WHDI system, wherein PHY signal transmission in WHDI uses a bandwidth of 5 Ghz.

At this time, as illustrated in FIG. 23, ULCPDU transmission can be performed for a short time period between the DLPDU transmission intervals. FIG. 23 is a diagram illustrating a video dependent timing relation between DLPDU and ULCPDU in a WHDI system. As described above, PHY signal transmission in WHDI uses a bandwidth of 5 Ghz.

Figure 24:
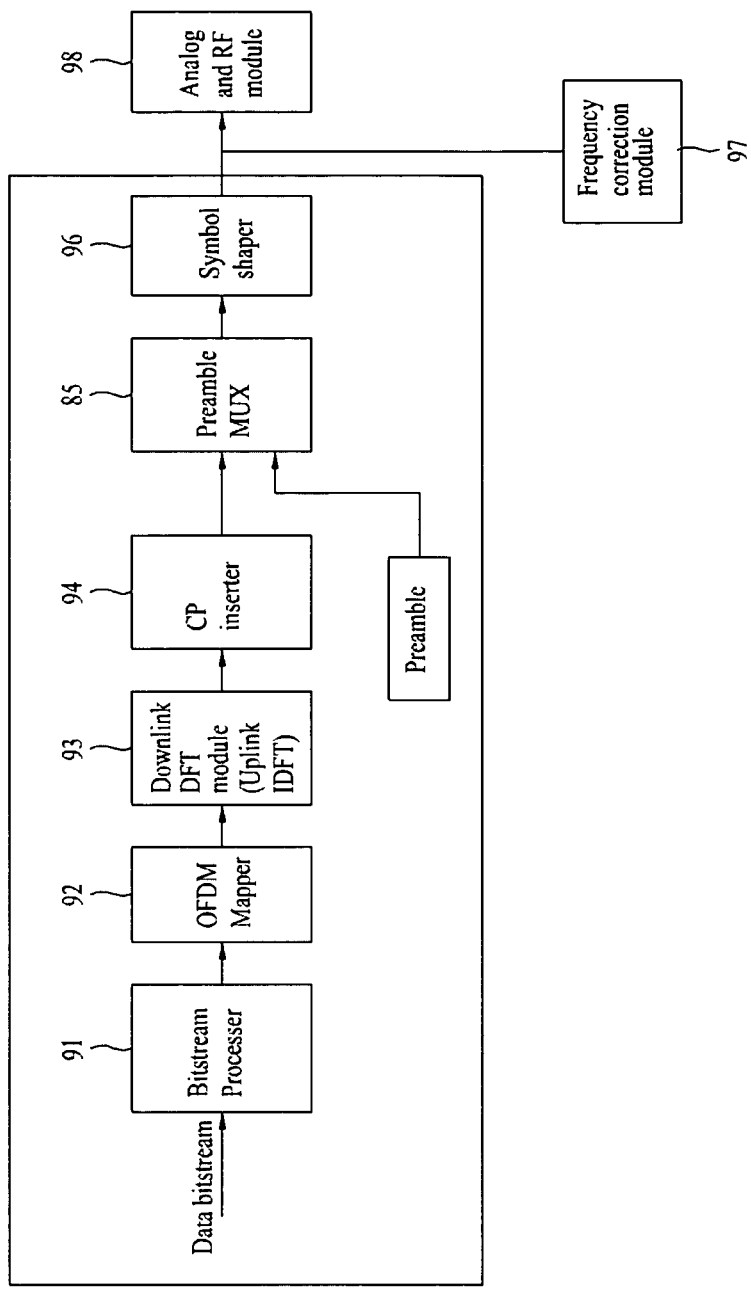
FIG. 24 is a block diagram illustrating a configuration of a ULCPDU transmitting device that transmits ULCPDU in a WHDI system.

FIG. 24 is a block diagram illustrating a configuration of a ULCPDU transmitting device that transmits ULCPDU in a WHDI system.

A reference implementation of the ULCPDU Baseband provides a reference for encoding the incoming control/data bitstream into an RF signal.

The ULCPDU transmitting device is similar to the aforementioned ULIPDU transmitting device of FIG. 21. Referring to FIG. 24, the ULCPDU transmitting device includes a bitstream processor 91 performing bitstream processing on the input data bitstream, an OFDM mapper 92 dividing the signals processed by the bitstream processor into pilots and data modulation symbols and mapping them into OFDM symbols, an uplink IDFT (downlink DFT) module 93 converting a block of constellation points to a time domain block, a cyclic prefix (CP) inserter 94 inserting the cyclic prefix to the modulated signal transmission, a preamble MUX 94 performing multiplexing between the preamble field and all other (CES, DATA) fields, a symbol shaper 96 performing symbol shaping on the time domain to comply with the spectral requirements, a frequency correction module 97 and an analog and RF module 98. Unlike the ULIPDU transmitting device, the frequency correction module 97 is only included in the ULCPDU transmitting device and performs frequency pre-correction to compensate for any frequency offsets between the transmitting device and the receiving device.

Figure 25:
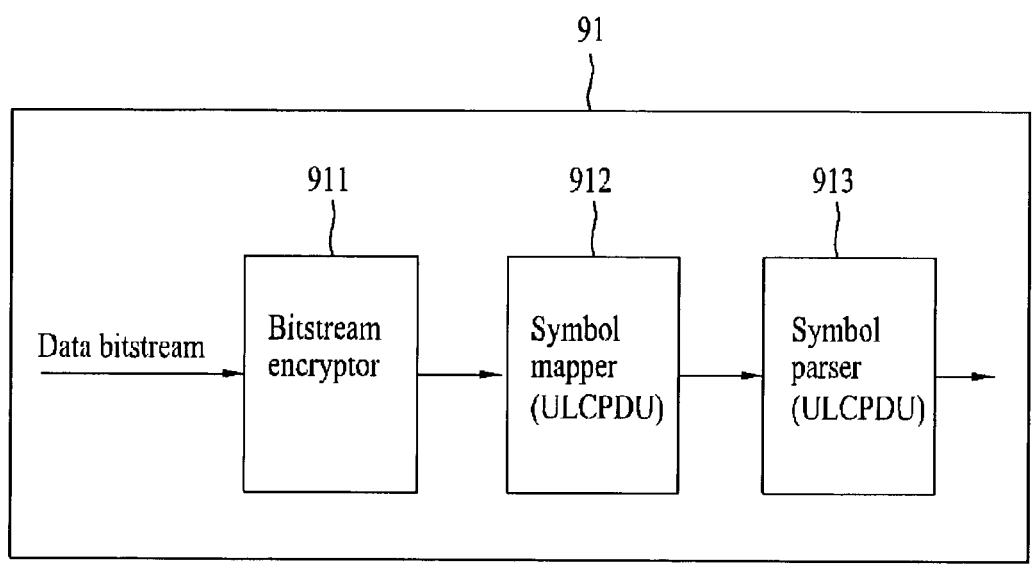
FIG. 25 is a block diagram illustrating a configuration of a bitstream processor in a ULCPDU transmitting device of a WHDI system.

Specifically, as illustrated in FIG. 25, the bitstream processor 91 includes a bitstream encryptor 911, a symbol mapper 912, and a symbol parser 913. FIG. 25 is a block diagram illustrating a configuration of a bitstream processor in a ULCPDU transmitting device of a WHDI system.

The bitstream encryptor 911 encrypts data bitstreams in accordance with AES-128 CTR mode. The symbol mapper 912 modulates the encrypted data bitstreams into a plurality of symbols in accordance with on-off keying mode in the same manner as the ULIPDU transmitting device. Afterwards, the symbol parser 913 determines what OFDM symbol includes each symbol.

The frequency correction module 97 is implemented in only the ULCPDU transmitting device. Frequency correction shall be performed prior to the transmission of the ULCPDU in order to compensate for any frequency offset between the ULCPDU transmitting device and a targeted ULCPDU receiver.

Frequency correction performed by the frequency correction module 97 is as follows.

$$\tilde{r}_{ULCPD}(t) = \exp(j2\pi f_{cor}t) r_{ULCPDU}(t) \quad \text{[Equation 2]}$$

In the Equation 2, $f_{cor}$ shall be set by the MAC layer, and shall be estimated from DLPDUs received from the source device including the targeted ULCPDU receiver. Specifically, $f_{cor}$ shall be set such that the frequency offset between the ULCPDU transmitting device and the targeted ULCPDU receiver, after correction, is less than 1325 Hz. The analog and RF module 98 of the ULCPDU transmitting device can flexibly coordinate carrier frequency up to 1325 Hz depending on a receiving error occurring in the receiving side.

As described above, in the user devices belonging to the WHDI, the source device that transmits A/V data and the sink device that receives the A/V data have been described in detail. If signal split, DFT modulation and quantization are performed in the devices having the aforementioned structure, transmission and reception of A/V data is performed.

Hereinafter, a method of transmitting and receiving A/V data between user devices in a WHDI will be described.

Figure 26:
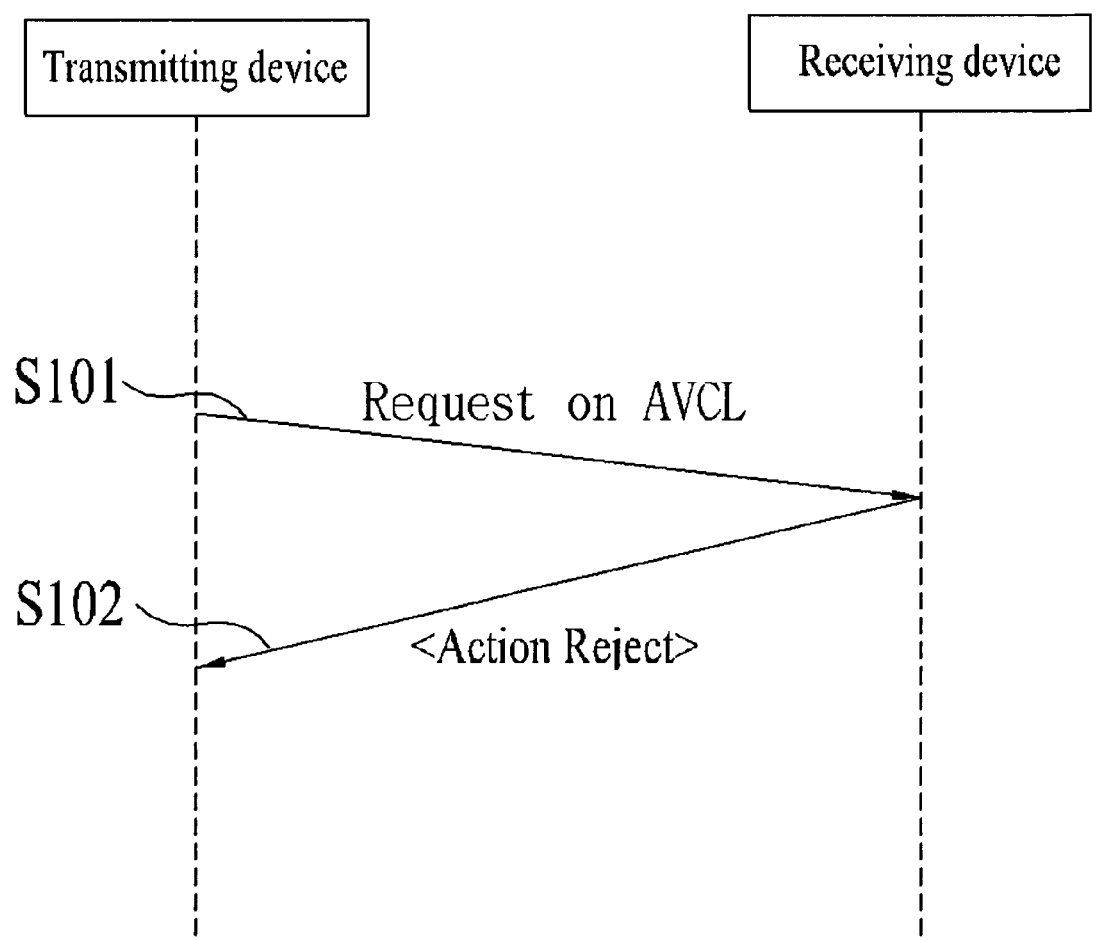
FIG. 26 is a diagram illustrating a process of exchanging AVCL command and a response message to the AVCL command for A/V data streaming between a transmitting device and a receiving device in a WHDI.

FIG. 26 is a diagram illustrating a process of exchanging AVCL command and a response message to the AVCL command for A/V data streaming between a transmitting device and a receiving device in a WHDI.

For A/V data streaming, the transmitting device transmits AVCL message or command to the receiving device prior to connection between the devices (S101). Referring to FIG. 3, the AVCL message or command is generated by the AVCL 32 of the transmitting device.

The AVCL command message transmitted through the transmitting device can include elements expressed in Table 1.

TABLE 1

| Field Name | Description | Size | Value |
| --- | --- | --- | --- |
| Initiator_Addr | Initiator_AVCL_Address | 2 Bytes | Byte 0: Initiator Device_ANA<br>Byte 1: Initiator Device_LSA |
| Follower_Addr | Follower AVCL_Address | 2 Bytes | Byte 0: Follower Device_ANA<br>Byte 1: Follower Device_LSA |
| AVCL Opcode | Opcode | 1 Bytes | |
| AVCL_Parameter | Parameter(s) specific to opcode (Optional, depending on opcode) | Depends on Opcode | |

Referring to Table 1, one AVCL command includes a transmitting device address (Initiator_Addr), a receiving device address (Follower_Addr), AVCL_Opcode, and an AVCL parameter as Identifier. One or more devices included in the WHDI network should be identified. Accordingly, in order to match the aforementioned device address system, bits indicating the transmitting device address and the receiving device address should be provided additionally. The transmitting device address (Initiator_Addr) is an address of a transmitting device that transmits AVCL command, and has a size of 2 bytes with 1 byte indicating ANA (address given by active source device when the transmitting device is the active source device) and 1 byte indicating LSA. The receiving device address (Follower_Addr) is a network address of a receiving device that receives AVCL command, and has a size of 2 bytes with 1 byte indicating ANA and 1 byte indicating LSA.

AVCL_Opcode represents a message type, and represents various commands as listed in Table 2.

When the AVCL command transmitted in step S101 is a command that requires an action, the receiving device which has received the command transmits a response message to the transmitting device, wherein the response message indicates that the receiving device cannot perform the requested action or is not ready for the action (S102). At this time, AVCL-Opcode represents action reject message among a plurality of commands illustrated in Table 2.

The action reject message includes a reason code as AVCL_parameter, wherein the reason code includes information related to the reason of action reject as a response message to be transmitted to the transmitting device when the receiving device cannot perform the requested action. The reason code will be described with reference to Table 3.

Table 3 illustrates action reject message, action accept message, wait message, and parameters included in each

TABLE 2

| Command Opcode | Command Opcode | Command Opcode | Command Opcode |
| --- | --- | --- | --- |
| <Action Reject> | <Record On> | <EDID Request> | <System Audio Mode Request> |
| <Action Accept> | <Record Off> | <EDID Status> | <System Audio Mode> |
| <Wait> | <Record Status> | <EDID Report> | <Audio Control> |
| <Get LSAs> | <Record Display> | <Get Subdevice Information> | <Give Audio Volume> |
| <Report LSAs> | <Clear Analog Timer> | <Report Subdevice Information> | <Report Audio Volume> |
| <Get LSA from OSD Name> | <Clear Digital Timer> | <Set Subdevice OSD Name> | <Set Audio Display> |
| <Report LSA from OSD Name> | <Clear External Timer> | <Give Deck Status> | <Audio Display> |
| <Active Stream Source> | <Set Analog Timer> | <Deck Status> | <Get Audio Display> |
| <Inactive Stream Source> | <Set Digital Timer> | <Deck Control> | <Present OSD String> |
| <Set Active Stream Source> | <Set External Timer> | <Play> | <Present OSD Menu> |
| <Request Active Stream Source> | <Set Timer Program Title> | <Give Tuner Device Status> | <OSD Menu Current Selection> |
| <Switch Stream Source> | <Timer Cleared Status> | <Tuner Device Status> | <OSD Menu Final Selection> |
| <AV Status> | <Timer Status> | <Select Analog Service> | <Present OSD Text Request> |
| <Get AV Status> | <User Control Pressed> | <Select Digital Service> | <OSD Text Response> |
| <Menu Request> | <User Control Released> | <Tuner Step Decrement> | <Get OSD Language> |
| <Menu Status> | <User Control Still Pressed> | <Tuner Step Increment> | <Report OSD Language> |
| <Device Setup> | <Standby> | <Vendor Command> | <Image View On> |
| | | | <Text View On> |

Referring to Table 2, various types of AVCL messages can be exchanged between the transmitting device and the receiving device. In this case, 'command opcode' is AVCL_Opcode, and represents response messages, respectively, depending on a command requested from the transmitting device to the receiving device and a requested command.

message, wherein the messages are response messages to AVCL_message, i.e., an action request message transmitted from the transmitting device to the receiving device. For AVCL_message transmission according to one embodiment of the present invention, a reason code is additionally provided as AVCL_parameter.

TABLE 3

| Command Opcode | Params | Param Length [Byte] | Params Options | Addressing | Response |
|---|---|---|---|---|---|
| <Action Reject> | [Rejected Opcode] | 1 | | Initiator and Follower swapped from rejected command | No response |
| | [Rejected Reason] | 1 | 0x00__Un-specified<br>0x01__Unrecognized Command<br>0x02__Invalid Parameter<br>0x03__Command not supported<br>0x04__Cannot perform action at this time<br>0x05__vender not supported<br>0x06__User rejection<br>0x07__No A/V Stream available<br>0x08__Mandatory parameter is missing<br>0x09__Host is in standby mode<br>0x0A__EDID not supported<br>0x11__System shut down<br>0x12__0xFF | | |
| <Action Accept> | [Accepted Opcode] | 1 | | Initiator and Follower swapped from accepted command | No response |
| <Wait> | [Deferred Opcode] | 1 | | Initiator and Follower swapped from received command | No response |

Referring to Table 3, the action reject message is used as a response message when the sink device which has received the AVCL message from the source device cannot process the AVCL message. The action reject message includes two parameters, [Rejected Opcode] and [Rejected Reason]. [Rejected Opcode] has a 1 byte size and designates OPCODE indicating that a message type that cannot be processed is action reject. [Rejected Reason] also has a 1 byte size and indicates the reason why that the receiving device cannot process the action request.

In Table 3, the action accept message indicates that the response process ends. The source device may transmit the action accept message to the sink device or not. The wait message is a response message corresponding to [Deferred Opcode], which is transmitted from the source device to the sink device to wait for a time period, for example, 500 ms, when the source device has no time to process a request message received from the sink device, wherein the request message includes a request of A/V data transmission. Even in the case that the source device transmits a wait message to the sink device, the reason why that the source device cannot process the message can be represented by a reason code as described below with reference to Table 3.

In Table 3, (0x0~0x12) codes are parameterized from the reasons of the action reject message when the sink device which has received the action request message from the source device transmits the action reject message.

The 0x0 parameter represents <Un-specified Command> message when the rejection reason of the sink device is not specified or cannot be identified. The 0x1 parameter represents <Unrecognized Command> message when the received command OPCODE is not defined in SPEC. The 0x2 parameter represents <Invalid Parameter> message when OPCODE of the message received from the transmitting device is not defined in SPEC even if the OPCODE is supported by the receiving device.

The 0x3 parameter represents <Command not supported> message and corresponds to a case where the receiving device which has received the action request message does not support a received command even in the case that the received command is a legal command not defined in SPEC. The 0x4 parameter represents <Cannot perform action at this time> message and is a message rejected as the receiving device cannot perform the requested action with receiving the action request message. The 0x5 parameter represents <Vender not supported> message when the receiving device which has received a control command specified by a vendor does not support the command requested from the vendor. The 0x6 parameter represents <User rejection> message when a user cannot use a function of a received command or rejects the requested command by rejecting the request message as soon as the request message is received.

The 0x7 parameter is a response to <Set Active Stream Source> command, and is included in the response message of the source device. Namely, the 0x7 parameter represents an action reject message that can be transmitted to the sink device when the source device which has received A/V streaming request from the sink device does not desire to transmit A/V streams to the active source device or cannot transmit A/V streams as the source device is not ready for audio or video output.

The 0x8 parameter represents <Mandatory Parameter is missing> message to transmit the action reject message as an error code when the command received by the receiving device does not include a desired parameter. The 0x9 parameter represents <Host is in standby mode> message and corresponds to a case where it is difficult to immediately process the request as a host device of the receiving device is in a standby mode of low power when the host device receives the request message from the transmitting device. The 0x10 parameter represents <EDID not supported> message corresponding to a case where EDID information is not included in the sink device when the sink device is requested the EDID information from the source device. The 0x11 parameter represents <Host is busy> message used when it is not possible to process the request message as a use rate of a host controller of the receiving device increases. The 0x12 parameter represents <System shut down> message for rejecting a request message when the request message is transmitted from the transmitting device while the system of the receiving device is being stopped.

Hereinafter, embodiments of a method of exchanging messages including the aforementioned AVCL_parameters between WHDI devices will be described with reference to FIG. 27 and FIG. 28.

Figure 27:
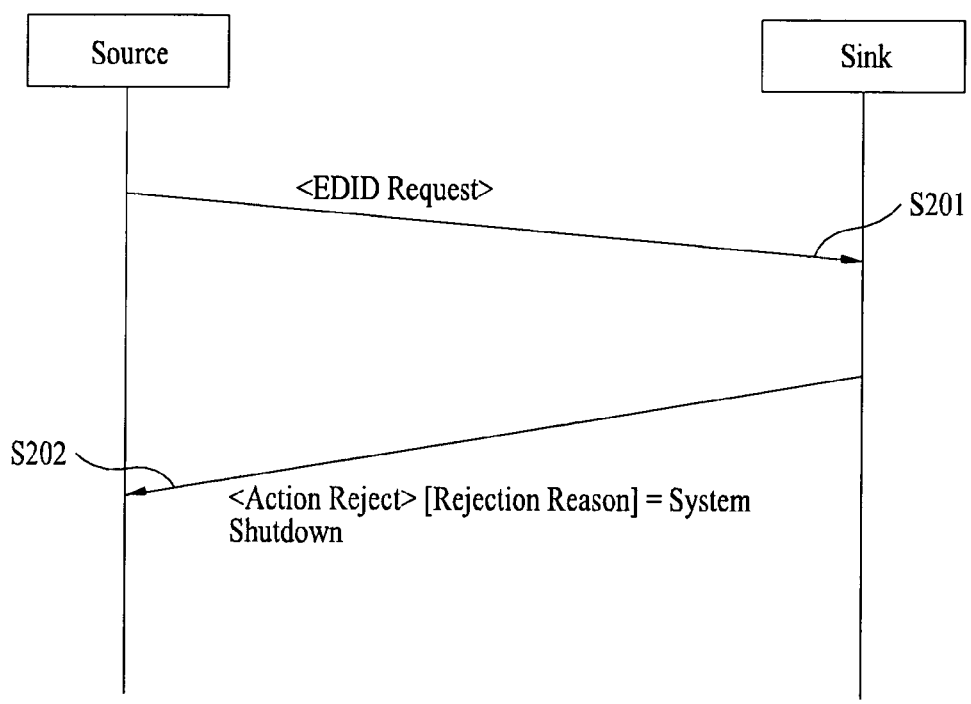
FIG. 27 is a diagram illustrating a process of transmitting a response message from a sink device to a WHDI source device when the WHDI source device requests the sink device to transmit extended display identification data (EDID) information in accordance with one embodiment of the present invention.

FIG. 27 is a diagram illustrating a process of transmitting a response message from a sink device to a WHDI source device when the WHDI source device requests the sink device to transmit EDID information in accordance with one embodiment of the present invention.

In step of starting A/V streaming between the source device and the sink device, the source device transmits an EDID request message to the sink device through the DLPDU to request EDID information (S201). In this case, the EDID information is a standard for transferring display information from a display side to a host side, and means a data type for transmitting the capability of the display side to the host side. In the WHDI, the source device is regarded as the display side and the sink device is regarded as the host.

The sink device which has received the <EDID Request> message from the source device transmits an action reject message including the 0x11 parameter indicating <System shut down> message to the source device if the system is being stopped by an input of a system shutdown button of a user (S202). At this time, the sink device transmits a response message to the source device using the ULCPDU. Accordingly, the source device can recognize through the AVCL_parameter included in the received response message that the requested action has been rejected due to the system shutdown not nonexistence of EDID in the sink device. Also, as a wrong assumption that EDID does not exist in the sink device does not occur, an error that may occur during connection between devices or signal transmission and reception can be avoided.

Figure 28:
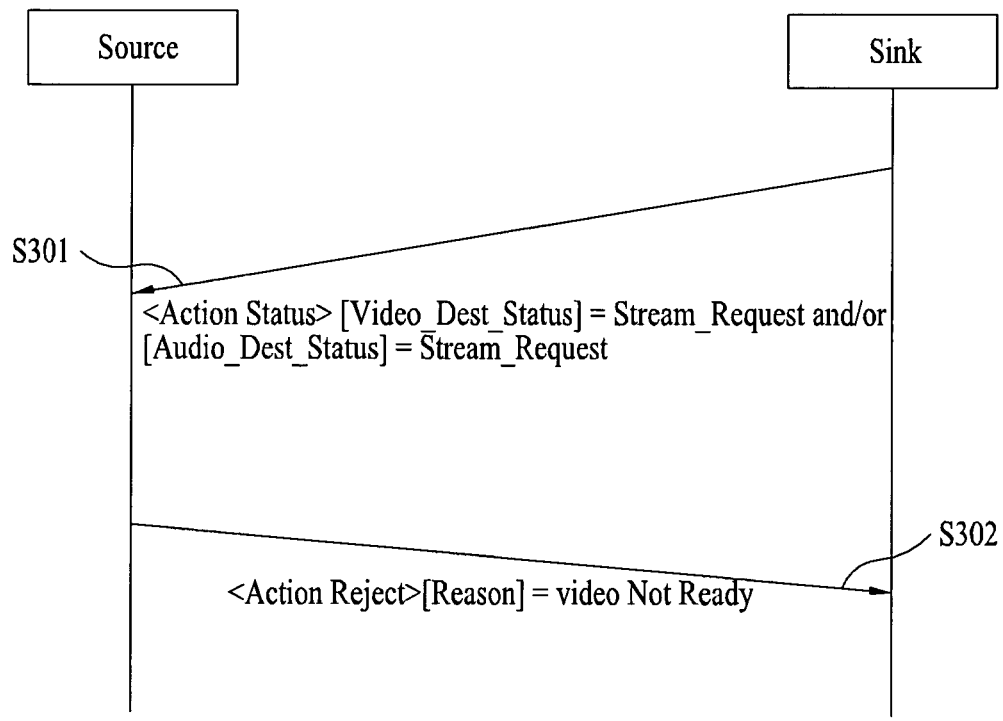
FIG. 28 is a diagram illustrating a process of transmitting a response message from a source device to a WHDI sink device when the WHDI sink device transmits <A/V Status> message to the source device to start A/V streaming in accordance with another embodiment of the present invention.

FIG. 28 is a diagram illustrating a process of transmitting a response message from a source device to a WHDI sink device when the WHDI sink device transmits <A/V Status> message to the source device to start A/V streaming in accordance with another embodiment of the present invention.

Referring to FIG. 28, the sink device transmits <A/V Status> message to the source device to request A/V streaming connection (S301). Then, the source device transmits an action reject message including the 0x7 parameter indicating <No A/V stream available> message to the sink device if audio signal or video signal is not output (S302). In this case, since the sink device knows that no video signal is output from the source device, the sink device waits until video signal is output by re-request or retries connection after identifying using a separate vendor-specific message whether video signal is output from the source device.

Next, a process of transmitting a wait message from the receiving device, which has received the A/V streaming request message from the transmitting device, to the transmitting device in response to the A/V streaming request message will be described with reference to Table 4.

As described above, the transmitting device that transmits a request message could be the source device or the sink device, and the receiving device that transmits a response message to the request message could be the sink device or the source device.

The receiving device which has received the AVCL_command from the transmitting device can transmit a response message indicating a wait message to the transmitting device through AVCL_Opcode. Alternatively, the receiving device can transmit the wait message to the transmitting device even if the AVCL_command is not requested from the transmitting device. If the status of the receiving device is difficult to accept a new request, the receiving device can first transmit the wait message to the transmitting device.

Hereinafter, for convenience of description, an example of a process of transmitting a wait message from the source device to the sink device when the sink device transmits <A/V status> command to the source device for A/V streaming connection will be described. Table 4 illustrates a wait message including response parameters.

TABLE 4

| Command Opcode | Params | Param Length [Bytes] | Params Options | Addressing | Response |
|---|---|---|---|---|---|
| <Wait> | [Defferd Opcode] | 1 | If 0xFF, all commands shall be deferred | Initiator and Follower swapped from rejected command | No response |
| | [Wait Time] [Wait Reason] | 1 | | | |

TABLE 4-continued

| Command Opcode | Params | Param Length [Bytes] | Params Options | Addressing | Response |
|---|---|---|---|---|---|
| | | 1 | 0x00_Unspecified 0x01_Video is not ready 0x02_Audio is not ready 0x03_System is starting-up 0x04_Host busy | | |

Referring to Table 4, the source device can transmit a response message to the sink device through [Deferred OPCODE] if processing of the AVCL_Opcode received from the sink device is delayed, wherein the response message includes 0xFF code including <all commands shall be deferred>. According to the related art, the source device transmits the response message including 0xFF code to the sink device regardless of the reason of delay, wherein the 0xFF code includes <all commands shall be deferred> as a wait message.

According to one embodiment of the present invention, the wait message can include parameters [WaitTime] and [WaitReason] in [Deferred OPCODE]. In this case, the parameter [WaitTime] is 1 byte and can describe delay time of wait information of the source device to 2.55 seconds in a unit of 10 ms, whereby the delay time can be described more exactly than 500 ms unit of the related art and delay can be minimized.

The parameter [WaitReason] is to explain the reason of delay of message processing requested from the source device to the sink device, and can transfer more exact delay information to the sink device or user. The 0x0 parameter of the parameter [WaitReason] represents <Unspecified> message that the sink device is not specified or cannot be identified. The 0x1 parameter of the parameter [WaitReason] represents <Video not ready> message that the source device fails to output video signal or is not ready to display image on the screen. The 0x2 parameter of the parameter [WaitReason] represents <Audio not ready> message that the source device fails to output audio signal or the sink device is not ready to output audio signal to a speaker. The 0x3 parameter of the parameter [WaitReason] represents <System is starting up> message that the sink device should be wait due to system booting of the source device when the source device receives a request message. The 0x4 parameter of the parameter [WaitReason] represents <Host busy> message that a host processor which is a master of the source device in the WHDI system fails to process the request due to its slow processing speed.

Figure 29:
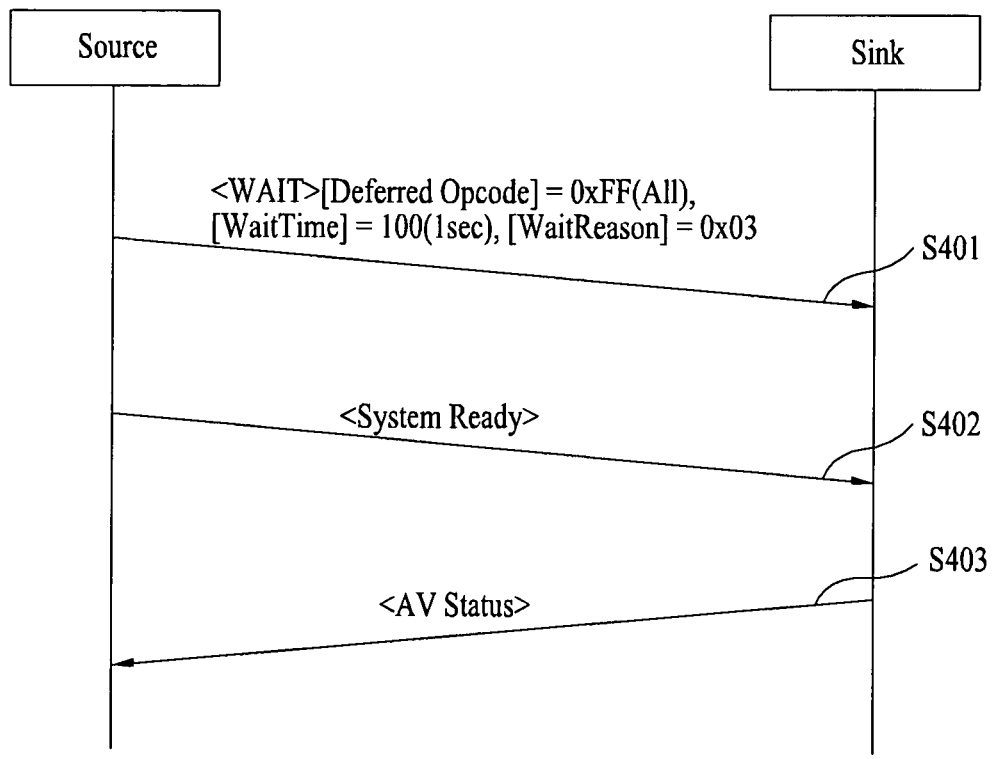
FIG. 29 is a diagram illustrating a process of transmitting a wait message from a source device, which has been requested A/V data transmission from a sink device, to the sink device in accordance with one embodiment of the present invention.

FIG. 29 is a diagram illustrating a process of transmitting a wait message from a source device, which has been requested A/V data transmission from a sink device, to the sink device in accordance with one embodiment of the present invention.

Referring to FIG. 29, the source device transmits a wait message to the sink device through the DLPDU even if a request message has been received from the sink device or not (S401). In this case, the wait message includes three kinds of information of the source device. Among the three kinds of information, OPCODE is a 0xFF code, and represents that all commands cannot be received. Also, the parameter [WaitTime] represents a delay time of 1 second, i.e., 100 ms, and indicates that the sink device which has received the wait message should wait for 1 second. The parameter [WaitReason] is a 0x3 code and represents <System is starting up> message indicating that the source device currently fails to receive A/V streaming request from the sink device due to system booting.

Meanwhile, the source device transmits <System Ready> message to the sink device through the DLPDU if it is ready to receive a request prior to a previously noticed delay time, so as to indicate that the source device is ready to process a message (S402). In this case, the sink device which has received the <System Ready> message transmits <AV Status> message to the source device through the ULCPDU processing more fast, whereby processing delay time can be reduced (S403). By contrast, if a delay time longer than the previously noticed delay time occurs or the delay time becomes longer than 2.55 seconds (2550 ms), the source device can continuously transmit a wait command to the sink device.

As described above, message exchange between the WHDI devices can be used as message exchange for switching of the sink device of the WHDI wireless network to the source device. This will be described with reference to FIG. 30 to FIG. 36.

Figure 30:
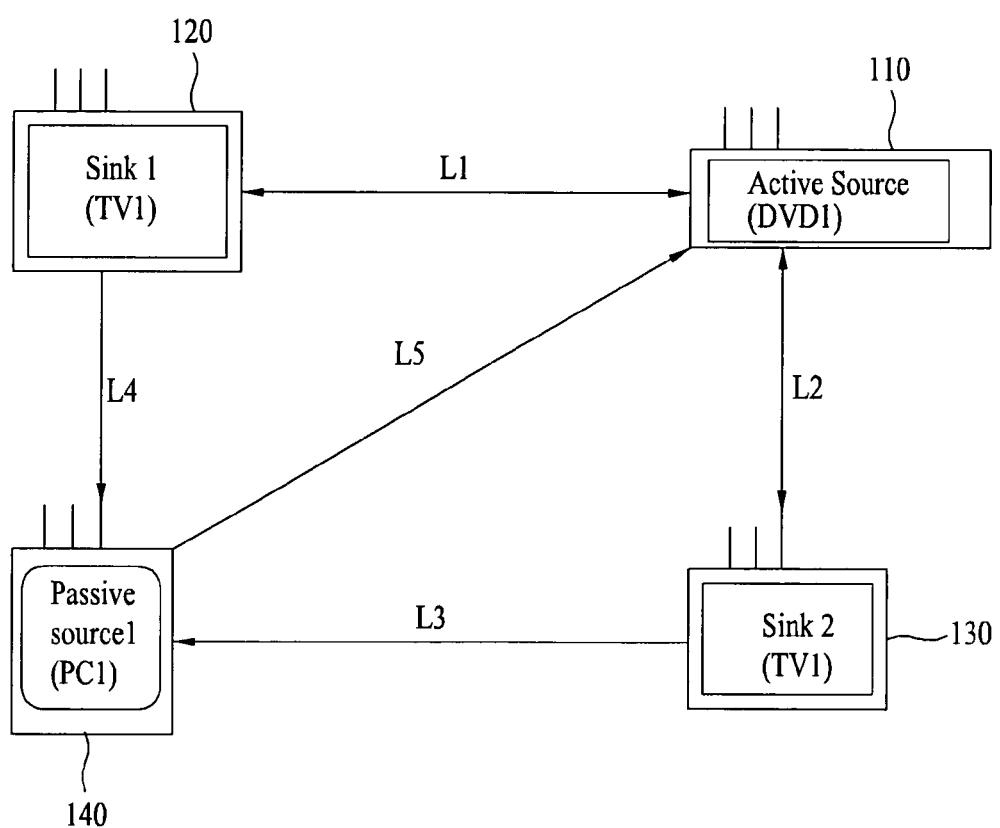
FIG. 30 is a diagram illustrating an example of a configuration of a WHDI network.

FIG. 30 is a diagram illustrating an example of a configuration of a WHDI network.

Referring to FIG. 30, one active source device 110 can broadcast A/V data to sink device 1 120 and sink device 2 130 using the DLPDU. The active source device 110 stores device ID (6 bytes) of each device and uses the device ID when transferring a device list to another device.

Meanwhile, the passive source device 140 can receive only uplink signals from the sink device 1 or the sink device 2 and decode them to data. Also, the passive source device 140 can transfer a message to the active source device 110 using the ULCPDU. Accordingly, routing paths of the control message correspond to paths L1, L2, L3, L4 and L5 between respective nodes of the active source device 110, the sink device 1 120, the sink device 2 130, and the passive source device 140.

Generally, in one WHDI network, the active source device only transmits the DLPDU while the other WHDI source devices fail to decode the DLPDU. Accordingly, if the active source device 110 transmits a control message such as "remote control path through" to the passive source device 140, the control message should be transmitted through the sink device 1 120 or the sink device 2 130. Namely, the control message should be transmitted through multi-radio paths including several radio paths such as a path of <L1, L4> including paths L1, L4 not L5 and a path of <L2, L3> including paths L2, L3.

Figure 31:
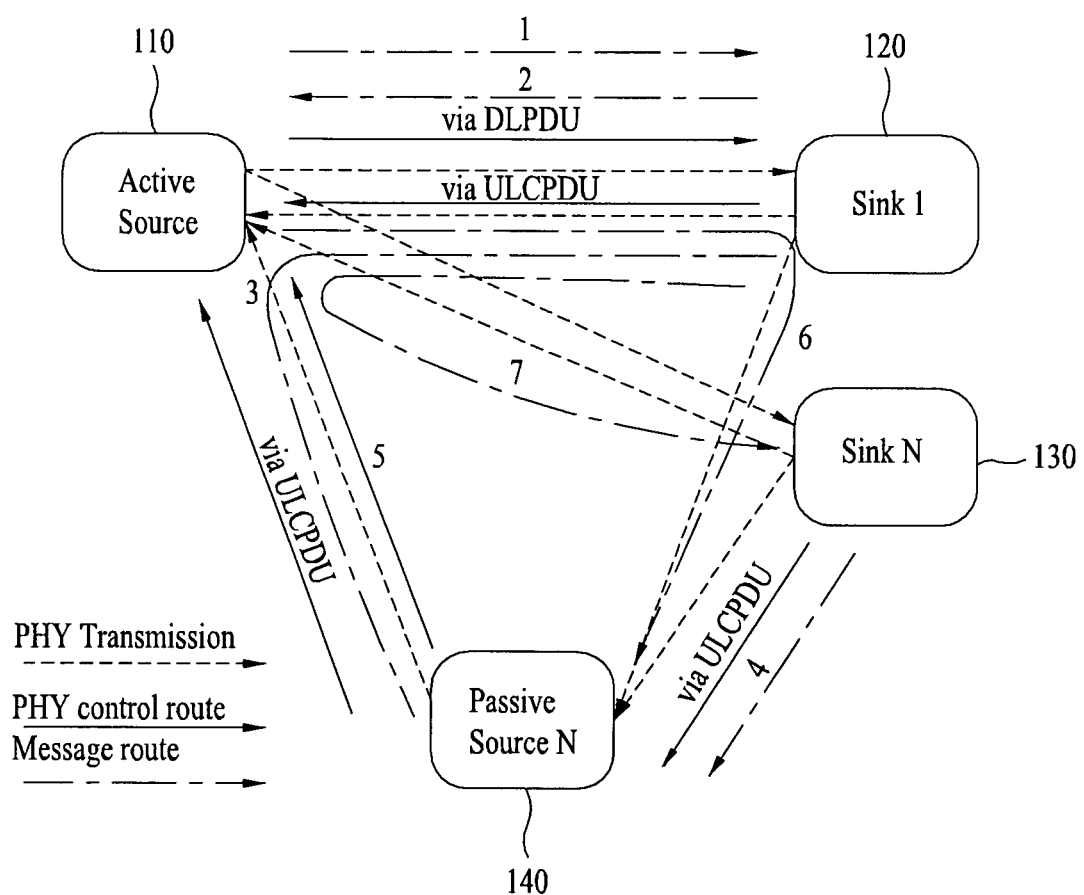
FIG. 31 is a diagram illustrating message transmission paths between devices on a WHDI network.
Figure 32:
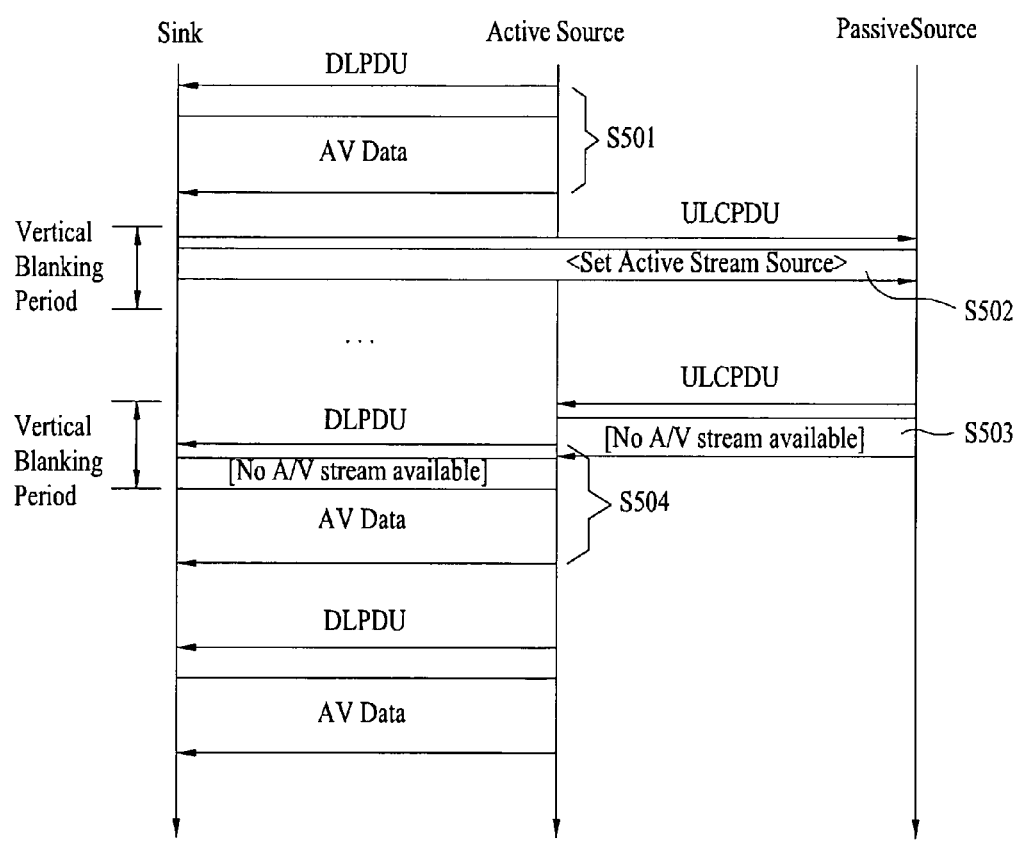
FIG. 32 is a diagram illustrating a process of transmitting a message to switch a source device connected with a sink device in accordance with another embodiment of the present invention.

Meanwhile, the sink device which has received A/V data from the source device can perform switching from the current source device to another source device located on the network as illustrated in FIG. 31 and FIG. 32.

FIG. 31 is a diagram illustrating message transmission paths between devices on a WHDI network.

FIG. 31 illustrates various paths that use DLPDU and ULCPDU to transmit a MAC message among the active source device, the passive source device, and a plurality of sink device on the WHDI network of FIG. 29. The active source device 110 can transmit a radio signal to at least one or more sink devices 120 and 130 on the WHDI network through the DLPDU simultaneously or in due order. The sink devices 120 and 130 can also transmit a radio signal to the active source device 110 and the passive source device 140 through the ULCPDU. As described above, the radio signal includes MAC message or A/V data, wherein the MAC message includes AVCL_command.

As described with reference to FIG. 30, like path 1 and path 2, direct message exchange can be performed between the active source device 110 and the sink device 1 120. Although not shown in FIG. 31, direct message exchange can also be performed between the active source device 110 and another sink device 130. However, the passive source device 140 cannot directly transmit a signal the sink devices 120 and 130, and should transmit the signal through the active source device 110 like path 3. Also, even in the case that the sink device 1 120 transmits a signal to the sink device 130, the sink device 1 120 should transmit the signal through active source device 110 like path 5.

At this time, the sink device can switch the connected source device to another source device as described with reference to FIG. 32.

FIG. 32 is a diagram illustrating a process of transmitting a message to switch a source device connected with a sink device in accordance with another embodiment of the present invention.

Referring to FIG. 32, the sink device 1 120 receives current A/V data from the active source device 110 through the DLPDU (S501).

When the source device connected with the sink device is intended to switch from the active source device 110 to the passive source device 140, the sink device 1 can transmit an action request message to the passive source device through the ULCPDU for the vertical blanking period, wherein the action request message includes <Set Active Stream Source> message as AVCL command (S502).

In this case, the AVCL command is generated by the AVCL 32 of the sink device of FIG. 3.

The source device and the sink device can exchange the AVCL command or message between them. Substantially, they exchange message, data, etc. through the PHY layer 34 of each device. For example, if the sink device intends to transmit AVCL request message to the passive source device as illustrated in FIG. 32, the AVCL 32 of the sink device transmits the AVCL request message to the passive source device through the PHY layer 34 after passing through the MAC layer 33.

Referring to FIG. 2, the broadcasting signal processing system which includes a broadcasting signal receiver 21 as an example of the transmitting device generates a signal including an AVCL request message in the network control module 216 and transmits the generated signal to the receiving device 25 together with an external broadcasting signal input to the receiving module 211. The broadcasting signal processing system also receives a radio signal including AVCL command in response to the AVCL request message generated by the receiving device 25. Hereinafter, a signal processing procedure performed by the network control module 216 will be described.

Referring to FIG. 3, all AVCL commands generated by the AVCL 32 of the sink device are transmitted to the MAC layer 33 so that the AVCL commands are mapped into the MAC message by their equivalent type. The <Set Active Stream Source> message which is a kind of AVCL commands according to the embodiment of the present invention is also transmitted from the AVCL 32 to the MAC layer 33. The MAC message of the MAC layer 33 is a medium that substantially transfers information between WHDI devices. A type and length of the MAC message can be set variously depending on each of the AVCL commands.

FIG. 33 is a diagram illustrating a type of a media access control (MAC) message generated by a MAC layer 33 of a transmitting device. The MAC message can be divided into a short MAC message and a long MAC message depending on whether the message includes a Null field. The MAC message illustrated in FIG. 33 is a short MAC message excluding the Null field. The Null field is a region allocated to transmit a Null message, and has a length of 1 byte and a value of 0x00.

Referring to FIG. 33, the short MAC message includes a MAC message preamble of 2 bytes of 16-bits length, a bit indicating MAC message type of 2 bytes, a MAC message length of 1 byte, a MAC message body of various lengths, and a message check sequence (MCS) field of 16 bits including cyclic redundancy check (CRC) of 16 bits. The MAC message body field can use various lengths from 1 bit to 254 bits depending on the AVCL command. Namely, when the transmitting device transmits the AVCL command to the receiving device, the AVCL command is included in the MAC body field of the MAC message of the transmitting device. According to the embodiment of the present invention, the <Set Active Stream Source> message which is a kind of the AVCL commands is included in the MAC body field so that it is transmitted to the passive source device.

The MCS field can be calculated on all fields of the MAC message excluding message preamble field, message type message length, and message body field. The long MAC message includes the Null field.

As described above, the MAC message that includes the AVCL command generated by the AVCL 32 of the sink device is transferred to the PHY layer 34 and then transmitted to the passive source device through the ULCPDU.

Figure 34:
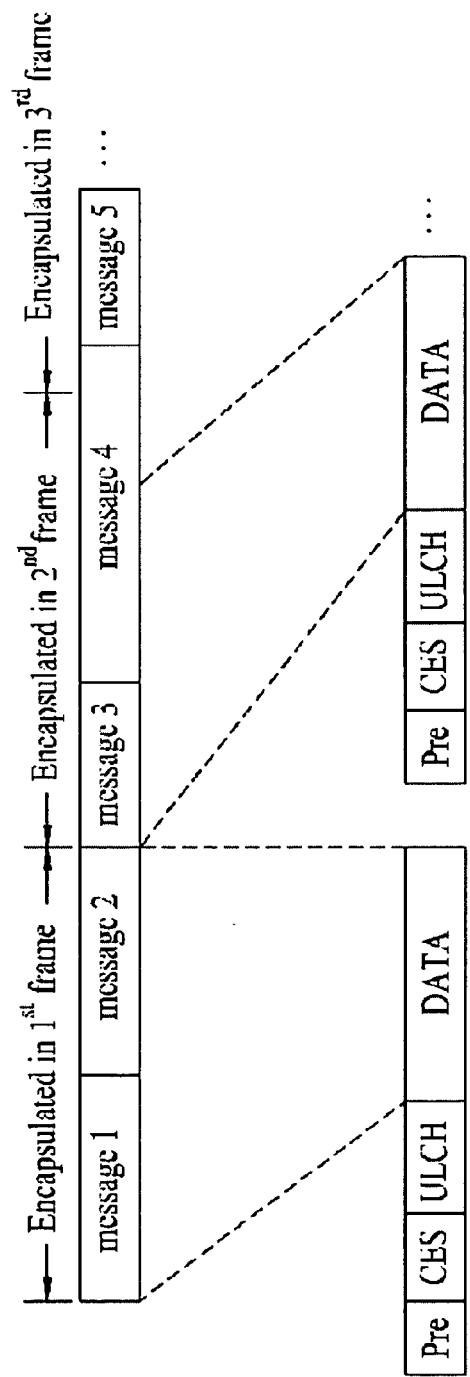
FIG. 34 is a diagram illustrating a process of transmitting a MAC message including AVCL command from a sink device to a source device through ULCPDU in accordance with one embodiment of the present invention.

FIG. 34 is a diagram illustrating a process of transmitting a MAC message including AVCL command from a sink device to a source device through ULCPDU in accordance with one embodiment of the present invention.

Referring to FIG. 34, the ULCPDU generally includes preamble, CES, uplink control header (ULCH), and a data field transmitting data/control bitstreams. The AVCL command which is the action request message included in the MAC message is included in the data field transmitting data/control bitstreams of the ULCPDU and then transmitted from the sink device to the active source device or the passive source device. In FIG. 32, the AVCL command is transmitted from the sink device to the passive source device using the ULCPDU. Since transmission through the ULCPDU is based on data having no relation with A/V data, the action request message, i.e., AVCL command is modulated to a radio signal by the bitstream processor 81 without multiplexing with A/V data as illustrated in FIG. 20. The data bitstreams including the modulated response message are mapped into OFDM symbols through the OFDM mapper 82, go through the IDFT module 83, are symbolized in a state that preamble is added thereto by the preamble MUX 85, and are transmitted to the source device through the RF module 87.

Next, in FIG. 32, the passive source device receives the ULCPDU including the AVCL command transmitted from the sink device through its PHY layer 34, and transfers the AVCL command to the AVCL 32 through the MAC layer 33. the AVCL 32 of the passive source device generates a response message in response to the <Set Active Stream Source> command transmitted from the sink device. The response message includes transmitting device address, receiving device address, AVCL_Opcode, and identifier. At this time, the host controller of the passive source device determines AVCL_Opcode indicating action accept message or action reject message, or wait message depending on whether to perform the action requested from the sink device, and includes reason code as AVCL_parameter.

In step S502, if the passive source device which has received the action request message of the <Set Active Stream Source> command from the sink device cannot be operated as the active source device or does not desire to switch to the active source device, the passive source device generates an action reject message as a response message in the AVCL 32 to report to the user that the passive source device cannot be operated as a second active source device or does not wish to switch to the second active source device. In other words, the action reject message means that the passive source device cannot transmit the A/V data to the sink device or does not wish to transmit A/V data to the sink device.

The action reject message includes Reason Code as an error code that specifies a reason of unavailable connection between devices. For example, among various reason codes listed in Table 3, the 0x07 parameter that means <No A/V stream available> can be included in the action reject message as Reason Code.

If the passive source device cannot be operated as the active source device or does not desire to switch to the active source device, the action reject message including Reason Code of <No A/V stream available> generated by the AVCL 32 of the passive source device is transmitted to the active source device through the ULCPDU for the vertical blanking period as described with reference to FIG. 33 (S503). The passive source device cannot directly transmit the response message to the sink device as described above. Accordingly, the passive source device transmits the response message to the active source device through the ULCPDU for the vertical blanking period (S503), and then the active source device transmits the response message to the sink device through the DLPDU (S504), whereby message exchange between the passive source device and the sink device can be performed. Namely, the active source device acts as an intermediate medium for transmitting a message from the passive source device to the sink device.

The step S503 is performed through the ULCPDU in the same manner as that the sink device transmits the <Set Active Stream available> command to the passive source device. Namely, in the same manner as FIG. 34, the active source device transmits the data field of the ULCPDU to the sink device, wherein the data field includes the MAC message including the AVCL message of the <No A/V Stream available> command transmitted form the passive source device.

When the active source device transmits a message to the sink device in step S504, the DLPDU is used as described with reference to FIG. 35 and FIG. 36.

Figure 35:
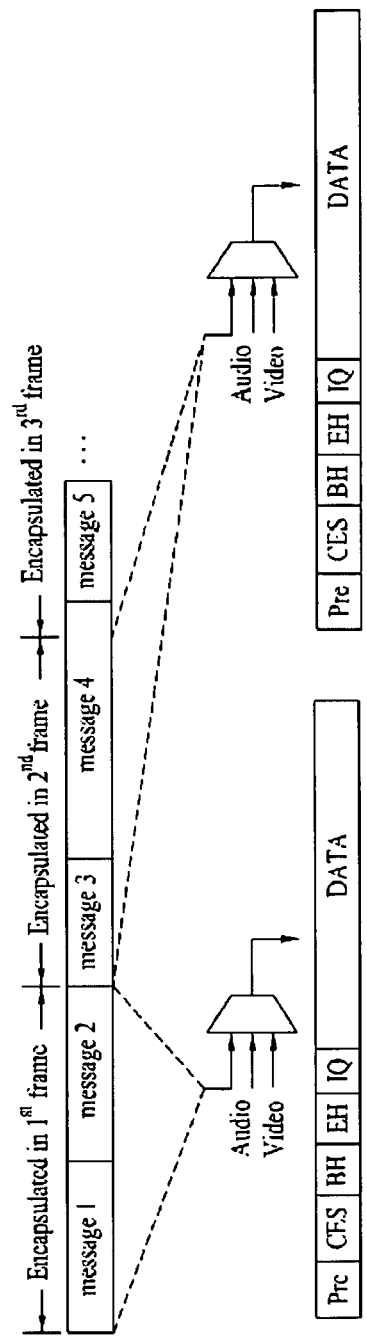
FIG. 35 is a diagram illustrating a process of transmitting a data field including a MAC message from a WHDI active source device to a sink device.
Figure 36:
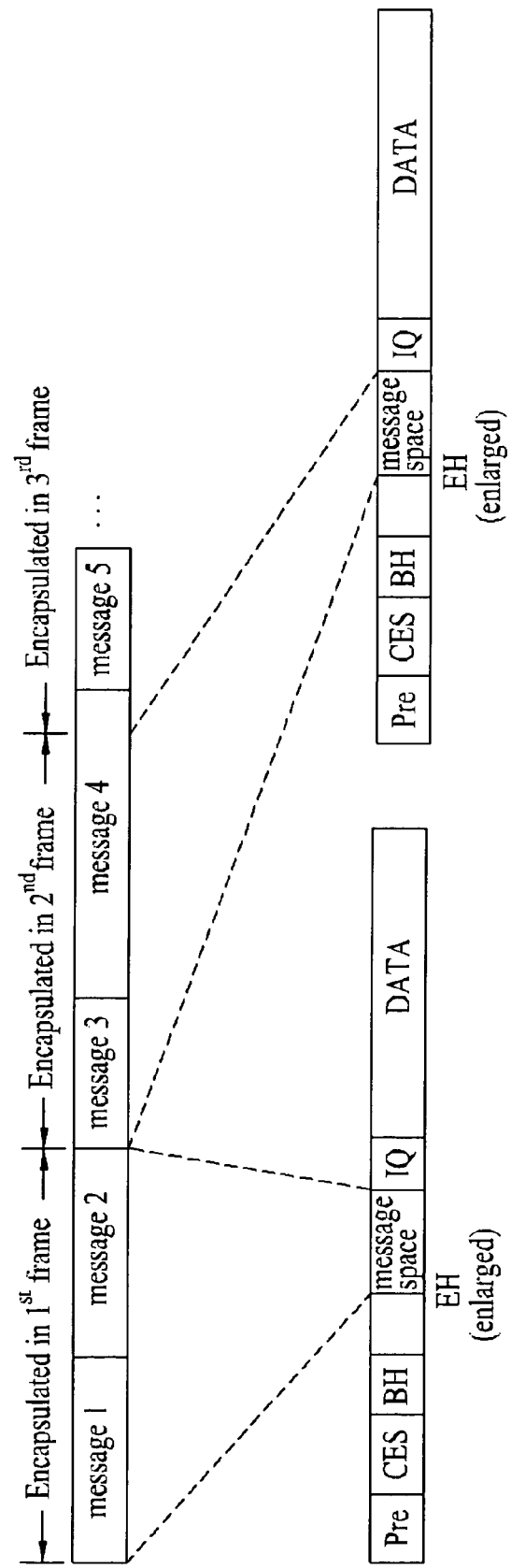
FIG. 36 is a diagram illustrating a process of transmitting an extended header (EH) including a MAC message from a WHDI active source device to a sink device.

FIG. 35 and FIG. 36 are diagrams illustrating a type of a MAC message transmitted from a WHDI active source device to a sink device.

Referring to FIG. 35, the active source device transmits a MAC message to the sink device through the DLPDU. At least one of a plurality of MAC messages of the source device is allocated onto a plurality of frames, and the PHY layer 34 configures a DLPDU for each frame and transmits the configured DLPDU to the sink device. The AVCL message generated as the response message including the AVCL command transmitted from the passive source device is included in a part of the MAC messages.

The DLPDU includes preamble, CES, a header interval including a basic header and an extended header (EH), IQ interval, and an interval for transmitting data/control bitstreams. The MAC message can be transmitted from a data field that transmits data/control bitstreams of the DLPDU. In this case, the MAC message is included in the control bitstreams.

Referring to FIG. 9, data/control bitstreams and test bitstreams, which are not encoded, and audio bitstreams and video coarse bitstreams, which are encoded, are multiplexed into one bitstream by the bitstream MUX 73. Namely, the MAC message that includes the <No A/V stream available> command as the response message of the <Set Active Stream Source> command is included in the control bitstreams, multiplexed with other data streams by the WHDI PHY layer, and encrypted by the coarse stream encryptor 74. Afterwards, the MAC message is transmitted to the sink device through the RF module after going through the signal transmitting process described with reference to FIG. 9.

Meanwhile, when the active source device transmits the MAC message to the sink device through the downlink, the active source device can transmit the MAC message through the data field of the aforementioned DLPDU or using the extended header.

FIG. 36 is a diagram illustrating an example of transmission of a MAC message from an active source device to a sink device through a DLPDU, wherein the MAC message is included in an extended header (EH).

The response message, <No A/V stream available> command, to the <Set Active Stream Source> command included in the extended header (EH) of the DLPDU is transmitted to the sink device through multiplexing, encryption, and modulation in the WHDI PHY layer together with other bitstreams as illustrated in FIG. 9.

Referring to FIG. 30, path L2 is used in step S501 of FIG. 32, path L3 is used in step S502, path L5 is used in step S503, and path L2 is used in step S504. Namely, although a single path can be used when the sink device transmits a signal to the passive source device, multi-paths of <L5, L2> should be used when the passive source device transmits a signal to the sink device.

Next, the sink device can determine whether to switch to the passive source device by disconnecting from the active source device depending on the response message transmitted from the passive source device.

As illustrated in FIG. 32, if the sink device receives an action reject message from the passive source device, the host process of the sink device determines to maintain current connection with the active source device. Namely, if the passive source device which has received the <Set Active Stream Source> command from the sink device cannot be operated as the active source device or does not desire to switch to the active source device, the passive source device responds to the sink device by transmitting <No A/V stream available> command and an action reject message including an error code, whereby the passive source device continues to receive A/V data from the active source device currently connected therewith (S505).

On the other hand, if the passive source device which has received the <Set Active Stream Source> command from the sink device responds to the sink device through the action accept message, the host processor of the sink device disconnects from the active source device and can switch to the passive source device.

The terms herein can be replaced with other terms. For example, "device" can be replaced with user device (or machine), station, etc., and "coordinator" can be replaced with coordinating (control) device, coordinating (or control) station, piconet coordinator, etc. Also, the AVCL command transmitted and received between devices can be used to mean the AVCL message.

Furthermore, although the aforementioned embodiments have been described based on the examples to which technical features of the present invention are applied to WVAN, the technical features of the present invention may be applied to a peer-to-peer communication system or other wireless network system.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, the signaling process for setting connection between the devices to transmit A/V data in the wireless network can be simplified.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of exchanging messages in a sink device to switch source devices in a wireless network; the method comprising:
   receiving, by the sink device, audio/video (A/V) data from a first source device;
   transmitting a first command from the sink device to a second source device within the wireless network to identify whether the second source device can transmit A/V data or not, wherein the first command is transmitted to the second source device by being encapsulated in an uplink control physical layer data unit (ULCPDU);
   receiving, by the sink device, a second command transmitted from the second source device in response to the first command, the second command including indication information indicating whether the second source device can transmit A/V data; and
   determining, by the sink device, whether to switch A/V data from the first source device to the second source device depending on the indication information included in the second command.

2. The method of claim 1, wherein if the indication information included in the second command indicates that the second source device does not wish or cannot become an active source device, the sink device receives the A/V data from the first source device.

3. The method of claim 2, wherein the A/V data are received from the first source device by being encapsulated in a first downlink physical data unit (DLPDU).

4. The method of claim 3, wherein the first DLPDU is transmitted for a time period including a first time period for which a MAC message and at least one header are transmitted and a second time period for which the A/V data are transmitted.

5. The method of claim 4, wherein an uplink control physical layer data unit (ULCPDU) is transmitted for the first time period.

6. The method of claim 1, wherein the second command is received from the first source device by being encapsulated in a second DLPDU.

7. The method of claim 6, wherein the second command is multiplexed with the A/V data transmitted from the first source device and then encapsulated in the second DLPDU.

8. The method of claim 6, wherein the second DLPDU includes a basic header and an extended header, and wherein the second command is encapsulated in the extended header.

9. The method of claim 1, wherein the step of transmitting the first command to the second source device includes:
   receiving the first command from an audio video control (AVC) layer in a medium access control (MAC) layer, the first command including a first identifier for identifying a transmitting device, a second identifier for identifying a receiving device, and an action code (Opcode);
   configuring a MAC message in the MAC layer and transferring the MAC message to a physical layer, the MAC message including a message preamble, a message type and the first command; and
   transmitting an uplink control physical layer data unit (ULCPDU) from the physical layer to the receiving device, the ULCPDU including an uplink control header, the MAC message and audio/video (A/V) data.

10. The method of claim 9, wherein the MAC message is multiplexed with the A/V data to be included in the ULCPDU in the physical layer.

11. The method of claim 9, wherein the MAC message includes a cyclic redundancy check (CRC) code added from the MAC layer to perform an error detection at the receiving device.

12. A sink device receiving A/V data from a first source device in a wireless network, the sink device comprising:
- an audio video control (AVC) layer generating a first command including a first identifier for identifying the sink device, a second identifier for identifying a second source device, and an action code;
- a medium access control (MAC) layer generating a MAC message including a message preamble, a message type and the first command transferred from the AVC layer; and
- a physical layer generating a first physical layer data unit including an uplink control header, the MAC message and audio/video data and transferring the first physical layer data unit to the second source device, and receiving a second physical layer data unit from the first source device, the second physical layer data unit including a second command transmitted from the second source device in response to the first command and including indication information indicating whether the second source device can transmit A/V data,
- wherein the first physical layer data unit is an uplink control physical layer data unit (ULCPDU),
- wherein the sink device determines to switch A/V data from the first source device to the second source device depending on the indication information included in the second command.

13. The sink device of claim 12, wherein if the indication information included in the second command indicates that the second source device does not wish or cannot become an active source device, the sink device receives the A/V data from the first source device.

14. The sink device of claim 12, wherein the second physical layer data unit is a downlink physical data unit (DLPDU).

15. The sink device of claim 14, wherein the DLPDU is transmitted for a time period including a first time period for which the MAC message and at least one header are transmitted and a second time period for which the A/V data are transmitted, and the ULCPDU is transmitted for the first time period for which a part of the DLPDU should be transmitted.

16. The sink device of claim 15, wherein the at least one header includes a basic header and an extended header, and the second command is encapsulated in the extended header.

17. The sink device of claim 14, wherein the second command is multiplexed with the A/V data transmitted from the first source device and then encapsulated in the DLPDU.

18. A sink device for use in a wireless network, the sink device comprising:
- a receiving module receiving a broadcasting signal from a first source device;
- a decoding module decoding the broadcasting signal received by the receiving module;
- a display module displaying contents according to the broadcasting signal decoded by the decoding module;
- a network control module generating a first physical layer data unit including a MAC message and transmitting the first physical layer data unit to a second source device, the MAC message including the broadcasting signal received by the receiving module and a first command for identifying whether the second source device can transmit A/V data, and receiving a second physical layer data unit including a second command from the first source device and processing the second physical layer data unit, the second command being transmitted from the second source device in response to the first command,
- wherein the first physical layer data unit is an uplink control physical layer data unit (ULCPDU); and
- a control module controlling the sink device to switch to the second source device through the second command processed by the network control module, store the broadcasting signal received by the receiving module in a local memory device, or play contents stored in the local memory device.

19. The sink device of claim 18, wherein the second command includes indication information indicating whether the second source device can transmit A/V data.

* * * * *